US008335728B1

(12) United States Patent
Dahodwala et al.

(10) Patent No.: US 8,335,728 B1
(45) Date of Patent: Dec. 18, 2012

(54) METHOD AND SYSTEM FOR PROVIDING REAL-TIME FINANCIAL GOAL MONITORING AND ANALYSIS

(75) Inventors: Ummulkiram Mohammed Dahodwala, Boston, MA (US); Aaron Elias Berhanu, San Francisco, CA (US); Simon Levy, Sunnyvale, CA (US); Justin Glaeser, Sunnyvale, CA (US)

(73) Assignee: Intuit Inc., Mountain View, CA (US)

( * ) Notice: Subject to any disclaimer, the term of this patent is extended or adjusted under 35 U.S.C. 154(b) by 408 days.

(21) Appl. No.: 12/638,156

(22) Filed: Dec. 15, 2009

(51) Int. Cl.
*G06F 17/30* (2006.01)
(52) U.S. Cl. .............. 705/27.1; 705/33; 705/24
(58) Field of Classification Search ............. 705/27.1, 705/38, 33, 24
See application file for complete search history.

(56) References Cited

U.S. PATENT DOCUMENTS

| | | | |
|---|---|---|---|
| 6,529,725 B1 * | 3/2003 | Joao et al. | 455/406 |
| 7,165,044 B1 * | 1/2007 | Chaffee | 705/37 |
| 7,451,134 B2 * | 11/2008 | Krakowiecki et al. | 1/1 |
| 7,599,909 B2 * | 10/2009 | Aldridge | 1/1 |
| 2007/0017974 A1 * | 1/2007 | Joao | 235/380 |
| 2007/0038931 A1 * | 2/2007 | Allaire et al. | 715/526 |
| 2007/0282673 A1 * | 12/2007 | Nagpal et al. | 705/11 |
| 2008/0120190 A1 * | 5/2008 | Joao et al. | 705/16 |
| 2009/0271267 A1 * | 10/2009 | Moukas et al. | 705/14.48 |
| 2009/0271287 A1 * | 10/2009 | Halpern | 705/26 |
| 2009/0299808 A1 * | 12/2009 | Gilmour et al. | 705/9 |
| 2010/0131473 A1 * | 5/2010 | Bjork et al. | 707/690 |
| 2010/0250430 A1 * | 9/2010 | Ariff et al. | 705/38 |
| 2011/0276441 A1 * | 11/2011 | Bond et al. | 705/30 |

OTHER PUBLICATIONS

PR Newswire, ConnectWise cloud, Corelytics dashboard provide complete integration of workflow and financial management; ConnectWise shows on-demand PSA at SMB nation fall, Oct. 2-4 in Las Vagas, Dated Oct. 1, 2009.*
ConnectWise, "Connectwise; Connectwise unveils cloud-based platform for third-party applications for IT servcie companies", Computer Weekly News, dated Oct. 15, 2009.*

* cited by examiner

*Primary Examiner* — Mark Fadok
(74) *Attorney, Agent, or Firm* — McKay and Hodgson, LLP; Philip McKay; Sean P. Lewis

(57) ABSTRACT

A method and system for providing real-time financial goal monitoring and analysis whereby a given user defines budgetary and/or financial goals for one or more financial categories for a given period of time. A merchant/category database is created that associates one or more merchants with potential financial categories and when the given user accesses a given user interface of a website associated with a given merchant, Uniform Resource Locator (URL) data for the website being accessed is obtained and used to identify the given merchant associated with the given website. The merchant/category database is then searched to find potential financial categories associated with the given merchant and the financial budget/goal data indicating the given user's budgetary and/or financial goals for the financial categories associated with the given merchant is then obtained along with current financial data indicating the given user's actual spending in each of the potential financial categories associated with the given merchant for the given period of time. Remaining balance data for the potential financial categories associated with the given merchant for the given period of time is then generated and displayed to the user in the same display displaying the user interface of the given merchant website.

16 Claims, 7 Drawing Sheets

WELCOME TO THE
ONLINE SHOPPING NETWORK

600

601
DEPARTMENTS

BOOKS

DVDs

CLOTHING

HARDWARE

611

| JAN | | | |
|---|---|---|---|
| CATEGORY | BUDGETED | SPENT | BAL |
| SCHOOL SUPP. | $100.00 | $60.72 | $39.28 |
| ENTERTAIN | $200.00 | $100.87 | $99.13 |
| CLOTHING | $100.00 | $52.00 | $48.00 |
| HOME MAINT. | $100.00 | $0.00 | $100.00 |

SEARCH

FIG. 6

METHOD AND SYSTEM FOR PROVIDING REAL-TIME FINANCIAL GOAL MONITORING AND ANALYSIS

BACKGROUND

Whether they acknowledge it or not, for most individuals, being aware of, and monitoring, the state of their finances and tracking their overall financial situation or "financial health" is an extremely important and fundamental responsibility. Unfortunately, due to a lack of time, limits of currently available resources, and in some instances, a lack of motivation, many individuals have historically failed to recognize and accept this responsibility. However, recent economic events have reminded many individuals of the urgent need to determine, and monitor, the state of their finances, as well as identify realistic financial goals, formulate plans of action to meet those financial goals, and monitor progress towards financial goals.

Several computing system implemented financial management systems are currently available to help an individual, or an authorized user on behalf of an individual, gather a user's financial data and/or process/analyze that user's own financial data into various budgets and/or reports based on parameters commonly provided by the user. Typically, these currently available computing system implemented financial management systems provide an individual/user with financial data such as, but not limited to, the user's overall financial worth data, the user's income data, the user's expense data, and the user's transactional data. However, currently, computing system implemented financial management systems typically present the user with data, budgeting analysis, and/or reports in the form of largely resultant data based on historical events. As a result, currently available computing system implemented financial management systems offer only time delayed summaries of financial activity after the fact, i.e., after the transactional choices have already been made by the user.

While this type of time-delayed "reactive" monitoring of financial goals and budget analysis currently available from computing system implemented financial management systems has several uses, it fails to provide the user with real-time monitoring and budgeting data at the time the user is contemplating a purchase. Therefore, the time-delayed "reactive" monitoring of financial goals and budget analysis currently available from computing system implemented financial management systems often does little to help the consumer ensure they are living within their means, making the desired progress towards their financial goals, and/or staying within their defined budgetary limits.

SUMMARY

In accordance with one embodiment, a method and system for providing real-time financial goal monitoring and analysis includes a process for providing real-time financial goal monitoring and analysis whereby, in one embodiment, a given user defines one or more budgetary and/or financial goals for one or more financial categories for a given period of time. In one embodiment, a merchant/category database is created that associates one or more merchants with one or more potential financial categories based, in one embodiment, on the merchandise and/or services offered by the one or more merchants. In one embodiment, when a user accesses a given user interface of a website associated with a given merchant, data indicating the Uniform Resource Locator (URL) of the website being accessed is obtained and used to identify the given merchant associated with the given website. In one embodiment, once the given merchant is identified, the merchant/category database is searched to find one or more potential financial categories associated with the given merchant. In one embodiment, the financial budget/goal data indicating the given user's one or more budgetary and/or financial goals for the one or more financial categories associated with the given merchant for the given period of time is then obtained. In one embodiment, current financial data indicating the given user's actual spending in each of the potential financial categories associated with the given merchant for the given period of time also is obtained. In one embodiment, the financial budget/goal data indicating the given user's one or more budgetary and/or financial goals for the one or more financial categories associated with the given merchant for the given period of time and the current financial data indicating the given user's actual spending in each of the potential financial categories associated with the given merchant for the given period of time is analyzed/compared and the results of the analysis, including remaining balance data for one or more of the potential financial categories associated with the given merchant for the given period of time, is generated. In one embodiment, the remaining balance data for one or more of the potential financial categories associated with the given merchant for the given period of time is then displayed to the user in the same display screen displaying user interface of the given merchant website that the user accessed.

In accordance with one embodiment, the given user defines one or more budgetary and/or financial goals for one or more financial categories for a given period of time using and/or through a computing system implemented data management system such as a computing system implemented personal financial management system.

As used herein, the term "computing system implemented data management system" includes, but is not limited to: computing system implemented, and/or web-based, financial management systems, packages, programs, modules, or applications; computing system implemented, and/or web-based, banking systems, packages, programs, modules, or applications; computing system implemented, and/or web-based, personal and small business financial management systems, packages, programs, modules, or applications; computing system implemented, and/or web-based, payroll systems, packages, programs, modules, or applications; computing system implemented, and/or web-based, accounting and/or invoicing systems, packages, programs, modules, or applications; computing system implemented, and/or web-based, business systems, packages, programs, modules, or applications; computing system implemented, and/or web-based, marketing device distribution systems, packages, programs, modules, or applications; computing system implemented, and/or web-based, financial institution financial management systems, packages, programs, modules, or applications; computing system implemented, and/or web-based, tax preparation systems, packages, programs, modules, or applications; computing system implemented, and/or web-based, business and/or point of sale systems, packages, programs, modules, or applications; computing system implemented, and/or web-based, healthcare management systems, packages, programs, modules, or applications; computing system implemented, and/or web-based, social networking and/or communication systems, packages, programs, modules, or applications; and various other computing system implemented, and/or web-based, electronic data driven systems, packages, programs, modules, or applications, whether known at the time of filing or as developed later.

As used herein, the term "computing system implemented financial management system" includes, but is not limited to: any computing system implemented, and/or web-based, data management system, package, program, module, or application that gathers financial data, including financial transactional data and/or has the capability to analyze and categorize at least part of the financial data. Herein, a computing system implemented financial management system can be, but is not limited to, any of the following: a computing system implemented personal and/or business financial management system, package, program, module, or application; a computing system implemented home and/or business inventory system, package, program, module, or application; a computing system implemented personal and/or business asset management system, package, program, module, or application; a computing system implemented personal and/or business accounting system, package, program, module, or application; a computing system implemented personal and/or business tax preparation system, package, program, module, or application; a computing system implemented healthcare management system, package, program, module, or application; and/or any of the numerous computing system implemented financial management systems discussed herein, and/or known to those of skill in the art at the time of filing, and/or as developed after the time of filing.

Specific examples of computing system implemented financial management systems include, but are not limited to: Quicken™, available from Intuit Inc. of Mountain View, Calif.; Quicken Online™, available from Intuit Inc. of Mountain View, Calif.; Quickbooks™, available from Intuit Inc. of Mountain View, Calif.; Quicken Health Expense Manager™, available from Intuit Inc. of Mountain View, Calif.; Mint.com™, available from Intuit Inc. of Mountain View, Calif.; Microsoft Money™, available from Microsoft, Inc. of Redmond, Wash.; and/or various other computing system implemented financial management systems discussed herein, and/or known to those of skill in the art at the time of filing, and/or as developed after the time of filing.

In various embodiments, the given user defines one or more budgetary and/or financial goals for one or more financial categories for a given period of time through, and/or the computing system implemented data management system is implemented on, one or more of: the given user's computing system; a computing system associated with the provider of the process for providing real-time financial goal monitoring and analysis; a computing system associated with the provider of the computing system implemented data management system; and/or a computing system associated with a third party.

Herein, the term "computing system", includes, but is not limited to: a portable computer; a workstation; a two-way pager; a cellular telephone; a smart phone; a digital wireless telephone; a Personal Digital Assistant (PDA); a media player, i.e., an MP3 player and/or other music and/or video player; a server computer; an Internet appliance; or any other device that includes components that can execute all, or part, of any one of the processes and/or operations as described herein. In addition, as used herein, the term computing system, can denote, but is not limited to, computing systems made up of multiple: computers; wireless devices; cellular telephones; digital telephones; two-way pagers; PDAs; media players; server computers; internet appliances; or any desired combination of these devices, that are coupled to perform the processes and/or operations as described herein.

In one embodiment, financial budget/goal data indicating the given user's one or more budgetary and/or financial goals for the one or more financial categories for the given period of time is associated with the given user, and the respective financial categories, and is then stored in whole, or in part, in any memory and/or database maintained by, accessible by, owned by, or otherwise related to, but not limited to, one or more of the following: a provider of the process for providing real-time financial goal monitoring and analysis; a provider of a computing system implemented data management system; one or more users; or any third party by any one of the numerous mechanisms known to those of skill in the art.

For instance, in various embodiments, the data, in whole, or in part, is stored in a memory system, or server memory system, or database, or in a cache memory, or in any main memory or mass memory, associated with a user computing system and/or another computing system and/or a dedicated database. In one embodiment, the data, in whole, or in part, is stored in any computing system and/or server system, or other device, in another, remote, location, or on/in a computer readable medium, and/or any other computer program product, as defined herein. In one embodiment, the data, in whole, or in part, is stored on a webpage, in a web-based system or on a public network such as the Internet.

In one embodiment, the merchant/category database that associates one or more merchants with one or more potential financial categories associated with the merchandise and/or services offered by the one or more merchants is implemented on, and/or created using, one or more of: the given user's computing system; a computing system associated with the provider of the process for providing real-time financial goal monitoring and analysis; a computing system associated with the provider of the computing system implemented data management system; and/or a computing system associated with a third party.

In one embodiment, the merchant/category database is created, at least in part, using data from the one or more merchants themselves. In one embodiment, the merchant/category database is created, at least in part, using screen scraping technology and/or data mining techniques. In one embodiment, the merchant/category database is created, at least in part, using data provided by one or more users. In one embodiment, the merchant/category database is created, at least in part, using data provided by one or more computing system implemented data management systems. In one embodiment, the merchant/category database is created, at least in part, using data provided by one or more computing system implemented data management systems and/or one or more user's historical categorizations of transactions involving the one or more merchants. In one embodiment, the merchant/category database is created, at least in part, using data provided by one or more computing system implemented data management systems and/or the given user's historical categorizations of transactions involving the one or more merchants. In one embodiment, the merchant/category database is created, at least in part, using data from any source of data that associates one or more merchants with one or more potential financial categories as discussed herein, and/or as known in the art at the time of filing, and/or as developed after the time of filing.

In one embodiment, a user accesses a given user interface of a website associated with a given merchant via any user computing system as discussed herein, and/or as known in the art at the time of filing, and/or as developed after the time of filing.

In one embodiment, a user accesses a given user interface of a website associated with a given merchant via one or more of: the given user's computing system; a computing system associated with the provider of the process for providing real-time financial goal monitoring and analysis; a computing system associated with the provider of the computing system implemented data management system; and/or a computing system associated with a third party.

In one embodiment, the URL data indicating the URL of the website being accessed is obtained via a web-browser plug-in to a web-browser implemented, at least in part on the user computing system. In on embodiment, the web-browser plug-in includes a component that registers itself as an observer for HTTP-ON-MODIFY-REQUEST.

In one embodiment, the URL data is used to identify the given merchant associated with the given website using one or more processors associated with one or more of: the given user's computing system; a computing system associated with the provider of the process for providing real-time financial goal monitoring and analysis; a computing system associated with the provider of the computing system implemented data management system; and/or a computing system associated with a third party.

For instance, in one embodiment, when the given user makes an http request, the web-browser plug-in observer fires an event to find out if the web-site is a merchant supported and/or registered with the process for providing real-time financial goal monitoring and analysis and/or for which data is available. In one embodiment, a default list of major merchants is installed on, or is accessible by, the user computing system.

In one embodiment, once the given merchant is identified, the merchant/category database is searched to find one or more potential financial categories associated with the given merchant using, and/or under the direction of, one or more processors associated with one or more of: the given user's computing system; a computing system associated with the provider of the process for providing real-time financial goal monitoring and analysis; a computing system associated with the provider of the computing system implemented data management system; and/or a computing system associated with a third party.

In one embodiment, once the one or more potential financial categories associated with the given merchant are identified, the financial budget/goal data indicating the given user's one or more budgetary and/or financial goals for the one or more financial categories associated with the given merchant for the given period of time is obtained from the stored financial budget/goal data indicating the given user's one or more budgetary and/or financial goals for the one or more financial categories for the given period of time using, and/or under the direction of, one or more processors associated with one or more of: the given user's computing system; a computing system associated with the provider of the process for providing real-time financial goal monitoring and analysis; a computing system associated with the provider of the computing system implemented data management system; and/or a computing system associated with a third party.

In one embodiment, at least part of the current financial data indicating the given user's actual spending in each of the potential financial categories associated with the given merchant for the given period of time is obtained from a computing system implemented data management system such as a computing system implemented personal financial management system.

As noted above, herein, the term "computing system implemented data management system" includes, but is not limited to: computing system implemented, and/or web-based, financial management systems, packages, programs, modules, or applications; computing system implemented, and/or web-based, banking systems, packages, programs, modules, or applications; computing system implemented, and/or web-based, personal and small business financial management systems, packages, programs, modules, or applications; computing system implemented, and/or web-based, payroll systems, packages, programs, modules, or applications; computing system implemented, and/or web-based, accounting and/or invoicing systems, packages, programs, modules, or applications; computing system implemented, and/or web-based, business systems, packages, programs, modules, or applications; computing system implemented, and/or web-based, marketing device distribution systems, packages, programs, modules, or applications; computing system implemented, and/or web-based, financial institution financial management systems, packages, programs, modules, or applications; computing system implemented, and/or web-based, tax preparation systems, packages, programs, modules, or applications; computing system implemented, and/or web-based, business and/or point of sale systems, packages, programs, modules, or applications; computing system implemented, and/or web-based, healthcare management systems, packages, programs, modules, or applications; computing system implemented, and/or web-based, social networking and/or communication systems, packages, programs, modules, or applications; and various other computing system implemented, and/or web-based, electronic data driven systems, packages, programs, modules, or applications, whether known at the time of filing or as developed later.

As also noted above, herein, the term "computing system implemented financial management system" includes, but is not limited to: any computing system implemented, and/or web-based, data management system, package, program, module, or application that gathers financial data, including financial transactional data, and/or has the capability to analyze and categorize at least part of the financial data. Herein, a computing system implemented financial management system can be, but is not limited to, any of the following: a computing system implemented personal and/or business financial management system, package, program, module, or application; a computing system implemented home and/or business inventory system, package, program, module, or application; a computing system implemented personal and/or business asset management system, package, program, module, or application; a computing system implemented personal and/or business accounting system, package, program, module, or application; a computing system implemented personal and/or business tax preparation system, package, program, module, or application; a computing system implemented healthcare management system, package, program, module, or application; and/or any of the numerous computing system implemented data management systems discussed herein, and/or known to those of skill in the art at the time of filing, and/or as developed after the time of filing.

As noted above, specific examples of computing system implemented financial management systems include, but are not limited to: Quicken™, available from Intuit Inc. of Mountain View, Calif.; Quicken Online™, available from Intuit Inc. of Mountain View, Calif.; Quickbooks™, available from Intuit Inc. of Mountain View, Calif.; Quicken Health Expense Manager™, available from Intuit Inc. of Mountain View, Calif.; Microsoft Money™, available from Microsoft, Inc. of Redmond, Wash.; and/or various other computing system implemented financial management systems discussed herein, and/or known to those of skill in the art at the time of filing, and/or as developed after the time of filing.

In one embodiment, at least part of the current financial data indicating the given user's actual spending in each of the potential financial categories associated with the given merchant for the given period of time is provided to, and/or entered into, and/or transferred to, and/or downloaded to, and/or otherwise obtained by, the process for providing real-time financial goal monitoring and analysis and/or a computing system implemented data management system associated with the process for providing real-time financial goal monitoring and analysis from the user, one or more banks, one or more credit card companies, a credit reporting agency or bureau, and/or any other financial institution or data source via any network or network system, as discussed herein, and/or available or known at the time of filing, and/or as later developed.

In one embodiment, at least part of the current financial data indicating the given user's actual spending in each of the potential financial categories associated with the given merchant for the given period of time is provided to, and/or entered into, and/or transferred to, and/or downloaded to, and/or otherwise obtained by, the process for providing real-time financial goal monitoring and analysis, and/or a computing system implemented data management system associated with the process for providing real-time financial goal monitoring and analysis, from the user, a bank, a credit card company, a credit reporting agency or bureau, and/or any other financial institution or data source through a user interface device, such as a keyboard, mouse, touchpad, voice recognition software, or any other device and/or system capable of providing user input to a computing system and/or for translating user actions into computing system operations, whether available or known at the time of filing or as developed later.

In one embodiment, at least part of the current financial data indicating the given user's actual spending in each of the potential financial categories associated with the given merchant for the given period of time is provided to, and/or entered into, and/or transferred to, and/or downloaded to, and/or otherwise obtained by, the process for providing real-time financial goal monitoring and analysis, and/or a computing system implemented data management system associated with the process for providing real-time financial goal monitoring and analysis, from a database maintained by the user, a bank, a credit card company, a credit reporting agency or bureau, and/or any other financial institution or data source, as discussed herein, and/or available or known at the time of filing, and/or as later developed.

In one embodiment, at least part of the current financial data indicating the given user's actual spending in each of the potential financial categories associated with the given merchant for the given period of time is provided to, and/or entered into, and/or transferred to, and/or downloaded to, and/or otherwise obtained by, the process for providing real-time financial goal monitoring and analysis, and/or a computing system implemented data management system associated with the process for providing real-time financial goal monitoring and analysis, from the user, a bank, a credit card company, a credit reporting agency or bureau, and/or any other financial institution or data source by embedding the data in, or on, a computer program product, as defined herein and providing the computer program product to the provider of computing system implemented financial management system associated with the process for providing real-time financial goal monitoring and analysis and/or the process for providing real-time financial goal monitoring and analysis.

In one embodiment, at least part of the current financial data indicating the given user's actual spending in each of the potential financial categories associated with the given merchant for the given period of time is provided to, and/or entered into, and/or transferred to, and/or downloaded to, and/or otherwise obtained by, the process for providing real-time financial goal monitoring and analysis, and/or a computing system implemented data management system associated with the process for providing real-time financial goal monitoring and analysis, from the user, a bank, a credit card company, a credit reporting agency or bureau, and/or any other financial institution or data source by any method, apparatus, process or mechanism for transferring data from one or more devices, computing systems, server systems, databases, web site/web functions and/or any devices having a data storage capability to one or more other devices, computing systems, server systems, databases, web site/web functions and/or any devices having a data storage capability, whether known at the time of filing or as thereafter developed.

In one embodiment, the financial budget/goal data indicating the given user's one or more budgetary and/or financial goals for the one or more financial categories associated with the given merchant for the given period of time and the current financial data indicating the given user's actual spending in each of the potential financial categories associated with the given merchant for the given period of time is analyzed/compared using, or under the direction of, one or more processors associated with one or more of: the given user's computing system; a computing system associated with the provider of the process for providing real-time financial goal monitoring and analysis; a computing system associated with the provider of the computing system implemented data management system; and/or a computing system associated with a third party.

In one embodiment, the difference between the given user's one or more budgetary and/or financial goals for the one or more financial categories associated with the given merchant for the given period of time and the current financial data indicating the given user's actual spending in each of the potential financial categories associated with the given merchant for the given period of time is calculated using, or under the direction of, one or more processors associated with one or more of: the given user's computing system; a computing system associated with the provider of the process for providing real-time financial goal monitoring and analysis; a computing system associated with the provider of the computing system implemented data management system; and/or a computing system associated with a third party.

In one embodiment, remaining balance data for one or more of the potential financial categories associated with the given merchant for the given period of time is then generated using, or under the direction of, one or more processors associated with one or more of: the given user's computing system; a computing system associated with the provider of the process for providing real-time financial goal monitoring and analysis; a computing system associated with the provider of the computing system implemented data management system; and/or a computing system associated with a third party.

In one embodiment, the remaining balance data for one or more of the potential financial categories associated with the given merchant for the given period of time is then displayed to the user using and/or under the direction of, one or more processors associated with one or more of: the given user's computing system; a computing system associated with the provider of the process for providing real-time financial goal monitoring and analysis; a computing system associated with the provider of the computing system implemented data management system; and/or a computing system associated with a third party.

In one embodiment, the remaining balance data for one or more of the potential financial categories associated with the given merchant for the given period of time is displayed to the user in the same display screen displaying user interface of the given merchant website that the user accessed and/or on: the given user's computing system; a computing system associated with the provider of the process for providing real-time financial goal monitoring and analysis; a computing system associated with the provider of the computing system implemented data management system; and/or a computing system associated with a third party.

In one embodiment, the remaining balance data for one or more of the potential financial categories associated with the given merchant for the given period of time is displayed to the user in the same display screen displaying user interface of the given merchant website that the user accessed in the form of any table, symbol, or graphical display. As an example, a table, a ledger, a thermometer, a sliding scale, any graphical representation, or any partially filled figure or symbol, or outline thereof, may be used. Moreover, these symbols, graphical displays, and scales may, in some embodiments, display the user's used funds, and/or unused funds, and/or the differential between the user's current spending and the identified financial goals.

In one embodiment, as the given user navigates within the given website associated with the given merchant, the potential financial categories associated with the given merchant are refined, updated, and/or narrowed to reflect only the specific financial categories associated with the specific interface of the given website being viewed and the remaining balance data for one or more of the potential financial categories associated with the given merchant for the given period of time is also refined, updated, and/or narrowed to reflect only the specific financial categories associated with the specific interface of the given website being viewed.

In addition, in various embodiments, as the given user selects specific items within the given website associated with the given merchant, the potential financial categories associated with the given merchant are refined, updated, and/or narrowed to reflect only the specific financial categories associated with the item selected and the remaining balance data for one or more of the potential financial categories associated with the given merchant for the given period of time is also refined, updated, and/or narrowed to reflect only the specific financial categories associated with the item selected.

In addition, in various embodiments, as the given user manipulates and/or interacts with specific items within the given website associated with the given merchant, such as, but not limited to, placing specific items in his or her shopping cart, placing specific items on his or her wish list, etc., the potential financial categories associated with the given merchant are refined, updated, and/or narrowed to reflect only the specific financial categories associated with the specific items and the remaining balance data for one or more of the potential financial categories associated with the given merchant for the given period of time is also refined, updated, and/or narrowed to reflect only the specific financial categories associated with the specific items.

As a specific illustrative example, assume, in one embodiment, a given user defines one or more budgetary and/or financial goals for one or more financial categories for a given period of time such that: the financial category of school supplies is allotted $100.00 for the month of January; the financial category of entertainment is allotted $200.00 for the month of January; the financial category of clothing is allotted $100.00 for the month of January; and the financial category of home maintenance is allotted $100.00 for the month of January.

In this specific example, further assume that, in January, the given user has already spent money in the budgeted financial categories as follows: $60.72 in the financial category of school supplies; $100.87 in the financial category of entertainment; $52.00 in the financial category of clothing; and $0.00 in the financial category of home maintenance.

In this specific example, further assume a merchant/category database is created that associates the given merchant "ONLINE SHOPPING NETWORK" with the potential financial categories of school supplies, entertainment, clothing, and home maintenance that reflect the merchandise and/or services offered by the given merchant "ONLINE SHOPPING NETWORK".

In this specific example, further assume the given user accesses a website associated with the given merchant "ONLINE SHOPPING NETWORK". Then, using one embodiment of the process for providing real-time financial goal monitoring and analysis disclosed herein, URL data indicating the URL of the given merchant "ONLINE SHOPPING NETWORK" is obtained and used to identify the given merchant as "ONLINE SHOPPING NETWORK".

In this specific example, in one embodiment, once the given merchant is identified as "ONLINE SHOPPING NETWORK", the merchant/category database is searched to find the one or more potential financial categories associated with "ONLINE SHOPPING NETWORK", in this specific example, school supplies, entertainment, clothing, and home maintenance, and the financial budget/goal data indicating the given user's one or more budgetary and/or financial goals for the financial categories school supplies, entertainment, clothing, and home maintenance, is obtained.

In this specific example, in one embodiment, current financial data indicating the given user's actual spending in each of the potential financial categories of school supplies, entertainment, clothing, and home maintenance, for January is obtained. Specifically, data indicating the spending discussed above of $60.72 in the financial category of school supplies, $100.87 in the financial category of entertainment, $52.00 in the financial category of clothing, and $0.00 in the financial category of home maintenance for January is obtained.

In this specific example, in one embodiment, the financial budget/goal data indicating the given user's one or more budgetary and/or financial goals for the one or more financial categories of school supplies, entertainment, clothing, and home maintenance, associated with the given merchant "ONLINE SHOPPING NETWORK" for the given period of January and the current financial data indicating the given user's actual spending in each of the potential financial categories of school supplies, entertainment, clothing, and home maintenance, associated with the given merchant "ONLINE SHOPPING NETWORK" for the given period of January is analyzed/compared and the results of the analysis, including remaining balance data for one or more of the potential financial categories of school supplies, entertainment, clothing, and home maintenance, associated with the given merchant "ONLINE SHOPPING NETWORK" for the given period of January, is generated. In this specific example, the remaining balance data for one or more of the potential financial categories of school supplies, entertainment, clothing, and home maintenance, associated with the given merchant "ONLINE SHOPPING NETWORK" for the given period of January is then displayed to the given user in the same display screen displaying the user interface of the given website that the given user accessed.

Continuing with this specific illustrative example, the remaining balance data for one or more of the potential financial categories of school supplies, entertainment, clothing, and home maintenance, associated with the given merchant "ONLINE SHOPPING NETWORK" for the given period of January includes data indicating $39.28 remaining in the financial category of school supplies, $99.13 in the financial category of entertainment, $48.00 in the financial category of clothing, and $100.00 in the financial category of home maintenance and this data is displayed to the given user in the "ONLINE SHOPPING NETWORK" user interface display screen that the given user accessed.

Continuing with this specific illustrative example, as the given user navigates within the given website associated with the given merchant "ONLINE SHOPPING NETWORK" to, as an example, the user interface associated with clothing, the potential financial categories associated with the given merchant are refined, updated, and/or narrowed to reflect only the financial category of clothing associated with the user interface currently being viewed and the remaining balance data for only the potential financial category of clothing, i.e., in this example, $48.00 in the financial category of clothing, is displayed to the given user in the "ONLINE SHOPPING NETWORK/Clothing" user interface that the given user has accessed.

Using the method and system for providing real-time financial goal monitoring and analysis disclosed herein, a connection is established between a webpage/website and/or web-based content currently being viewed by a given user, the merchant associated with the webpage/website and/or web-based content currently being viewed by a given user, potential financial categories associated with that merchant, user budgets associated those financial categories, and actual user spending in those financial categories for a defined period of time. Then, using one embodiment of the method and system for providing real-time financial goal monitoring and analysis disclosed herein, these connections are leveraged to provide the user with a real-time display within the webpage/website and/or web-based content currently being viewed by a given user indicating to the given user what funds remain in each financial category associated with the webpage/website and/or web-based content currently being viewed by a given user. Consequently, using the method and system for providing real-time financial goal monitoring and analysis disclosed herein, a given user can observe their relevant categorized budget and available balance at or before the time of purchase, i.e., in "real-time" to make better spending decisions based on the real-time information and analysis displayed. Therefore, using the method and system for providing real-time financial goal monitoring and analysis disclosed herein, the given user has a better opportunity to stay within budget, achieve financial goals, avoid overdrafts, and generally monitor their financial position before making a purchase.

As discussed in more detail below, using the below embodiments, with little or no modification and/or user input, there is considerable flexibility, adaptability, and opportunity for customization to meet the specific needs of various users under numerous circumstances.

BRIEF DESCRIPTION OF THE DRAWINGS

FIG. 6 is an exemplary user interface screen associated with a merchant website and including a remaining balance data display in accordance with one embodiment.

Figure 1:
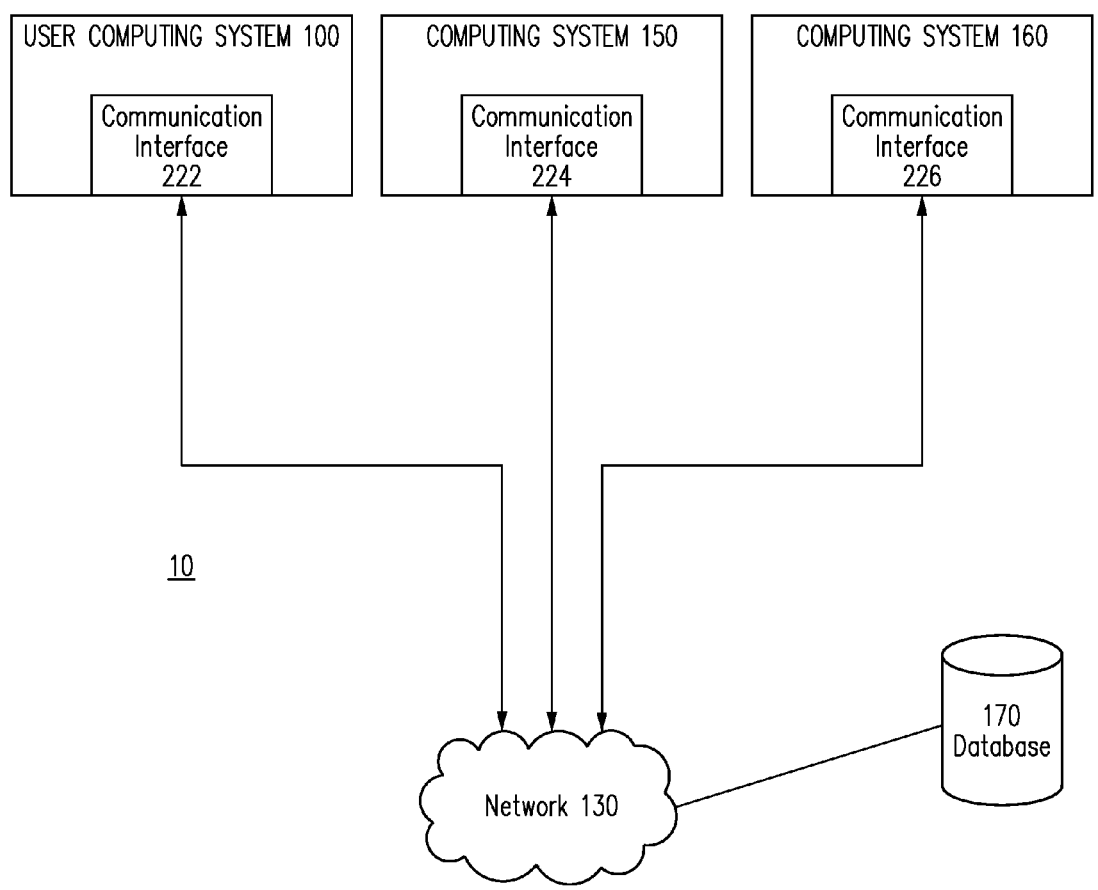
FIG. 1 is a block diagram of an exemplary hardware architecture for implementing one embodiment including a user computing system, a communication network, a database, and computing systems, in accordance with one embodiment.

Common reference numerals are used throughout the FIG.s and the detailed description to indicate like elements. One skilled in the art will readily recognize that the above FIG.s are examples and that other architectures, modes of operation, orders of operation and elements/functions can be provided and implemented without departing from the characteristics and features of the invention, as set forth in the claims.

DETAILED DESCRIPTION

Embodiments will now be discussed with reference to the accompanying FIG.s, which depict one or more exemplary embodiments. The following description includes reference to specific embodiments for illustrative purposes. However, the illustrative discussion below is not intended to be exhaustive or to limit the invention to the precise forms disclosed. Many modifications and variations are possible in view of the teachings below. The embodiments discussed below were chosen and described in order to explain the principles of the invention, and its practical applications, to thereby enable others skilled in the art to utilize the invention and various embodiments with various modifications as may be suited to the particular use contemplated. Therefore, embodiments may be embodied in many different forms than those shown and discussed herein and should not be construed as limited to the embodiments set forth herein, shown in the FIG.s, and/or described below.

In accordance with one embodiment, a method and system for providing real-time financial goal monitoring and analysis includes a process for providing real-time financial goal monitoring and analysis whereby, in one embodiment, a given user defines one or more budgetary and/or financial goals for one or more financial categories for a given period of time. In one embodiment, a merchant/category database is created that associates one or more merchants with one or more potential financial categories based, in one embodiment, on the merchandise and/or services offered by the one or more merchants. In one embodiment, when a user accesses a given user interface of a website associated with a given merchant, URL data indicating the URL of the website being accessed is obtained and used to identify the given merchant associated with the given website. In one embodiment, once the given merchant is identified, the merchant/category database is searched to find one or more potential financial categories associated with the given merchant. In one embodiment, the financial budget/goal data indicating the given user's one or more budgetary and/or financial goals for the one or more financial categories associated with the given merchant for the given period of time is then obtained. In one embodiment, current financial data indicating the given user's actual spending in each of the potential financial categories associated with the given merchant for the given period of time also is obtained. In one embodiment, the financial budget/goal data indicating the given user's one or more budgetary and/or financial goals for the one or more financial categories associated with the given merchant for the given period of time and the current financial data indicating the given user's actual spending in each of the potential financial categories associated with the given merchant for the given period of time is analyzed/compared and the results of the analysis, including remaining balance data for one or more of the potential financial categories associated with the given merchant for the given period of time, is generated. In one embodiment, the remaining balance data for one or more of the potential financial categories associated with the given merchant for the given period of time is then displayed to the user in the same display screen displaying user interface of the given merchant website that the user accessed.

FIG. 1 shows a block diagram of an exemplary hardware system 10 suitable for implementing one embodiment of a process for providing real-time financial goal monitoring and analysis, such as exemplary process 500 of FIG. 5 discussed below. Returning to FIG. 1, exemplary hardware system 10 includes: one or more user computing system(s) 100, including communication interface 222; computing system 150, including communication interface 224; computing system 160, including communication interface 226; and database 170; all communicating via communication interfaces 222, 224, 226, and network 130.

In one embodiment, one or more of user computing system (s) 100 are client computing systems. In one embodiment, one or more of user computing system(s) 100 are server computing systems that are, in turn, associated with one or more client computing systems. In one embodiment, one or more of user computing system(s) 100 are representative of multiple user computing systems. In one embodiment, one or more of user computing system(s) 100 are part of a cloud computing environment. In one embodiment, user computing system(s) 100 are used, and/or are accessible, by another computing system, such as computing systems 150 and/or 160 (discussed below) or any one or more of other user computing system(s) 100.

As used herein, the term "computing system", such as is included in the terms "user computing system" and "computing system" includes, but is not limited to: a desktop computing system/computer; a portable computer; a workstation; a two-way pager; a cellular telephone; a smart phone; a digital wireless telephone; a Personal Digital Assistant (PDA); a media player, i.e., an MP3 player and/or other music and/or video player; a server computer; an Internet appliance; or any other device that includes components that can execute all, or part, of any one of the processes and/or operations as described herein. In addition, as used herein, the term computing system, can denote, but is not limited to, computing systems made up of multiple: computers; wireless devices; cellular telephones; digital telephones; two-way pagers; PDAs; media players; server computers; Internet appliance; or any desired combination of these devices, that are coupled to perform the processes and/or operations as described herein.

In various embodiments, user computing system(s) 100 can be any computing system as defined herein, and/or as known in the art at the time of filing, and/or as developed thereafter, that includes components that can execute all, or part, of a process for providing real-time financial goal monitoring and analysis in accordance with at least one of the embodiments as described herein. A more detailed discussion of user computing system(s) 100 is provided below with respect to FIG. 2.

Returning to FIG. 1, in one embodiment, computing system 150 is any computing system as defined herein and/or as known in the art at the time of filing and/or as developed thereafter, that includes components that can execute all, or part, of a process for providing real-time financial goal monitoring and analysis in accordance with at least one of the embodiments as described herein. In one embodiment, computing system 150 is associated with any, but not limited to, one or more of the following: a provider of the process for providing real-time financial goal monitoring and analysis; a provider of a given computing system implemented data management system; one or more users; or any third party.

In one embodiment, computing system 150 is representative of two or more computing systems. In one embodiment, computing system 150 is a client computing system associated with one or more server computing systems. In one embodiment, computing system 150 is a server computing system that is, in turn, associated with one or more client computing systems. In one embodiment, computing system 150 is part of a cloud computing environment. A more detailed discussion of computing system 150 is provided below with respect to FIG. 3.

Returning to FIG. 1, in one embodiment, computing system 160 is any computing system as defined herein and/or as known in the art at the time of filing and/or as developed thereafter, that includes components that can execute all, or part, of a process for providing real-time financial goal monitoring and analysis in accordance with at least one of the embodiments as described herein. In one embodiment, computing system 160 is associated with any, but not limited to, one or more of the following: a provider of the process for providing real-time financial goal monitoring and analysis; a provider of a given computing system implemented data management system; one or more users; or any third party.

In one embodiment, computing system 160 is representative of two or more computing systems. In one embodiment, computing system 160 is a client computing system associated with one or more server computing systems. In one embodiment, computing system 160 is a server computing system that is, in turn, associated with one or more client computing systems. In one embodiment, computing system 160 is part of a cloud computing environment. A more detailed discussion of computing system 160 is provided below with respect to FIG. 4.

Also shown in FIG. 1 is database 170. In one embodiment, database 170 is a data storage device, a designated server system or computing system, or a designated portion of one or more server systems or computing systems, such as computing system(s) 100 and/or computing system 150 and/or computing system 160, or a distributed database, or an external and/or portable hard drive. In one embodiment, database 170 is a dedicated mass storage device implemented in software, hardware, or a combination of hardware and software. In one embodiment, database 170 is a merchant/category database including data associating one or more merchants with one or more potential financial categories based, in one embodiment, on the merchandise and/or services offered by the one or more merchants. In one embodiment, database 170 is a web-based function. As discussed in more detail below, in one embodiment, database 170 is under the control of, or otherwise accessible by, a process for providing real-time financial goal monitoring and analysis, and/or a provider of a computing system 150, and/or a provider of a computing system 160. In one embodiment, database 170 is part of a cloud computing environment.

In one embodiment, computing system(s) 100, computing system 150, computing system 160, and database 170, are coupled through network 130. In various embodiments, network 130 is any network, communications network, or network/communications network system such as, but not limited to, a peer-to-peer network, a hybrid peer-to-peer network, a Local Area Network (LAN), a Wide Area Network (WAN), a public network, such as the Internet, a private network, a cellular network, a combination of different network types, or other wireless, wired, and/or a wireless and wired combination network capable of allowing communication between two or more computing systems, as discussed herein, and/or available or known at the time of filing, and/or as developed after the time of filing.

In one embodiment, computing system(s) 100, computing system 150, computing system 160, and database 170, are coupled in a cloud computing environment.

Figure 2:
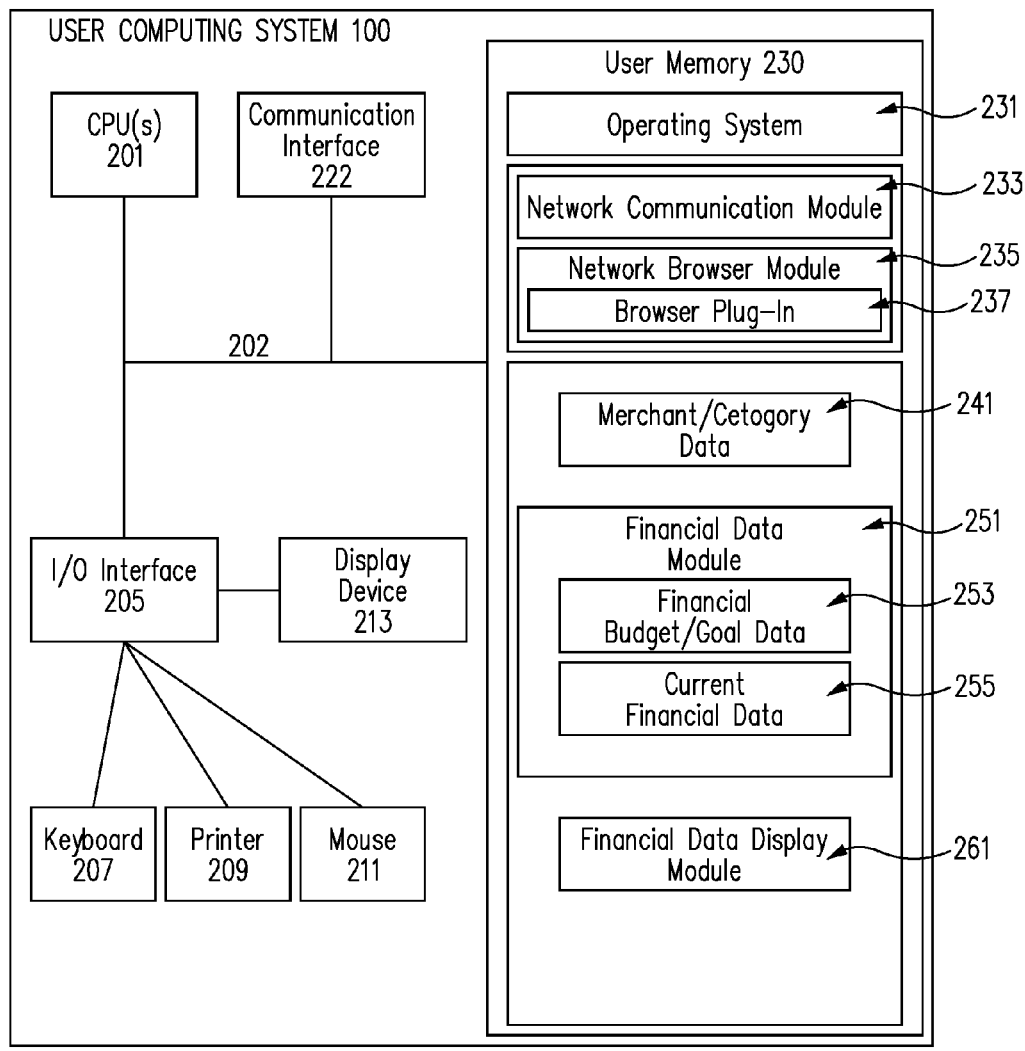
FIG. 2 is a block diagram of an exemplary user computing system of FIG. 1, in accordance with one embodiment.

FIG. 2 is a more detailed block diagram of an exemplary user computing system 100. As seen in FIG. 2, in one embodiment, user computing system 100 includes one or more Central Processing Unit(s), CPU(s) 201; user memory 230; at least one communication interface 222; an Input/Output interface, I/O interface 205, including one or more user interface devices such as display device 213, keyboard 207, printer 209, and/or mouse 211; all interconnected by one or more communication buses 202.

As also seen in FIG. 2, in one embodiment, user memory 230 can store data and/or instructions associated with, but not limited to, the following elements, subsets of elements, and/or super sets of elements for processing by one or more processors, such as CPU(s) 201 (FIG. 2) and/or 301 (FIG. 3) and/or 401 (FIG. 4): operating system 231 that includes procedures, data, and/or instructions for handling various services and performing/coordinating hardware dependent tasks; network communications module 233 that includes procedures, data, and/or instructions, for, along with communication interface 222, connecting user computing system 100 to other computing systems, such as other user computing system 100 and/or computing system 150 of FIG. 1, and/or computing system 160 of FIG. 1, and/or a network, such as network 130 of FIG. 1, and/or a database, such as database 170 of FIG. 1; network browser module 235 that includes procedures, data, and/or instructions, for, along with communication interface 222, providing user computing system 100, and/or a given user access to a network, such as the Internet; merchant/category data 241 that includes procedures, data, and/or instructions, associated with obtaining and storing data associating one or more merchants with one or more potential financial categories; financial data module 251 includes procedures, data, and/or instructions, associated with obtaining and storing financial data associated with a given user of user computing system 100; and financial data display module 261 that includes procedures, data, and/or instructions, for displaying remaining balance data for one or more potential financial categories associated with a given merchant for a given period of time in a same display as a user interface of a given merchant website that the user has accessed.

As also seen in FIG. 2, in one embodiment, network browser module 235 includes browser plug-in 237 that includes procedures, data, and/or instructions, for registering itself as an observer for HTTP-ON-MODIFY-REQUEST and, in one embodiment, identifying and sending the URL data to other computing systems, such as computing systems 150 and/or 160, to identify a given merchant associated with a given website using one or more processors associated with one or more of: the given user's computing system; a computing system associated with the provider of the process for providing real-time financial goal monitoring and analysis; a computing system associated with the provider of the computing system implemented data management system; and/or a computing system associated with a third party.

As also seen in FIG. 2, in one embodiment, financial data module 251 includes financial budget/goal data 253 and current financial data 255. In one embodiment, financial budget/goal data 253 includes data indicating a given user's budgetary and/or financial goals for one or more financial categories. In one embodiment, current financial data 255 includes data indicating a given user's current financial data regarding the given user's actual spending in one or more financial categories.

Those of skill in the art will readily recognize that the choice of components, data, modules, and information shown in FIG. 2, the organization of the components, data, modules, and information shown in FIG. 2, and the manner of storage and location of storage of the data, modules, and information shown in FIG. 2 was made for illustrative purposes only and that other choices of components, data, modules, and information, organization of the components, data, modules, and information, manner of storing, and location of storage, of the data, modules, and information can be implemented without departing from the scope of the invention as set forth in the claims below. In particular, the various modules and/or data shown in FIG. 2 are illustrative only and not limiting. In various other embodiments, the particular modules and/or data shown in FIG. 2 can be grouped together in fewer modules and/or data locations or divided among more modules and/or data locations. Consequently, those of skill in the art will recognize that other orders and/or grouping are possible and the particular modules and/or data, order, and/or grouping shown in FIG. 2 discussed herein do not limit the scope as claimed below.

A more detailed discussion of the operation of exemplary user computing system 100 and user memory 230 is provided below with respect to FIG. 5.

Figure 3:
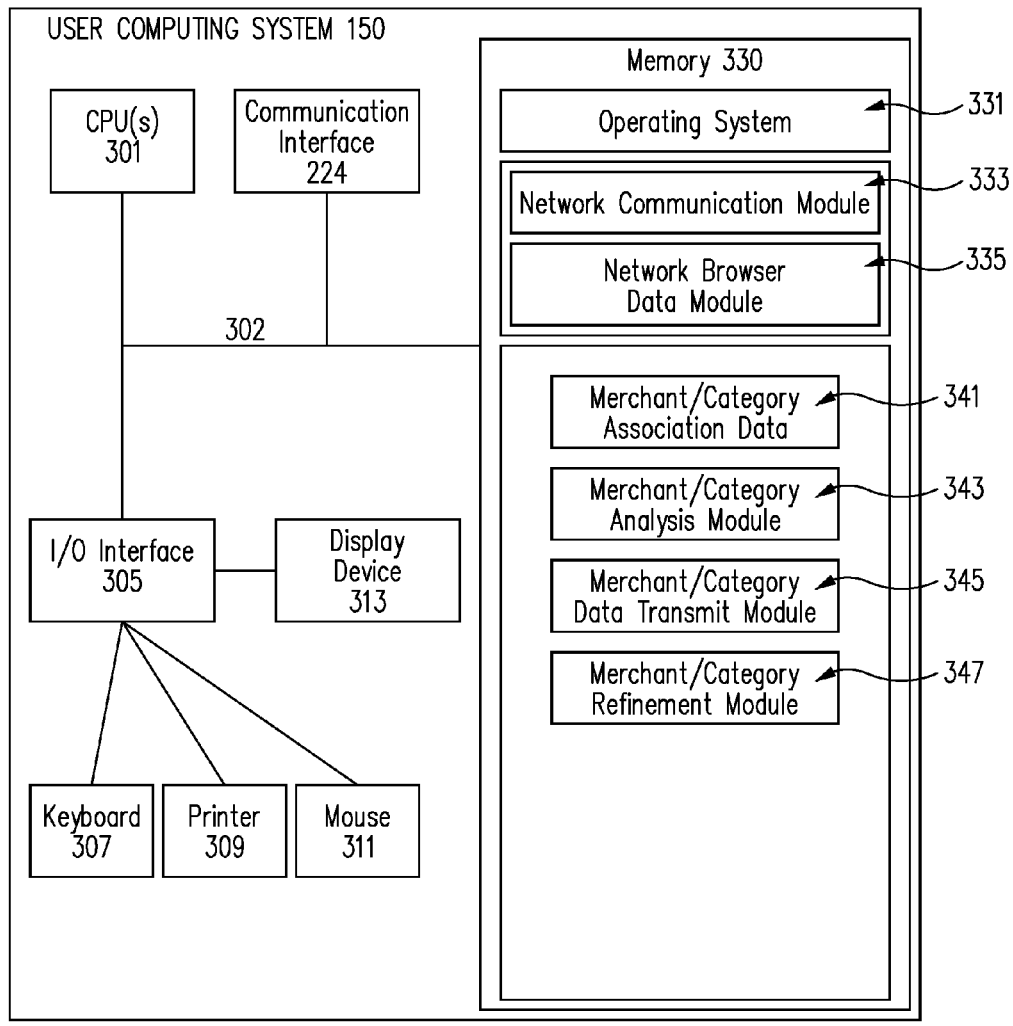
FIG. 3 is a block diagram of an exemplary computing system of FIG. 1, in accordance with one embodiment.

FIG. 3 is a more detailed block diagram of an exemplary computing system 150. As seen in FIG. 3, in one embodiment, computing system 150 includes one or more Central Processing Unit(s), CPU(s) 301; computing system memory system 330; at least one communication interface 224; an Input/Output interface, I/O interface 305, including one or more user interface devices such as display device 313, keyboard 307, printer 309, and/or mouse 311; all interconnected by one or more communication buses 302.

As also seen in FIG. 3, in one embodiment, computing system memory system 330 can store data and/or instructions associated with, but not limited to, the following elements, subsets of elements, and/or super sets of elements for use in processing by one or more processors, such as CPU(s) 201 (FIG. 2) and/or 301 (FIG. 3) and/or 401 (FIG. 4): operating system 331 that includes procedures, data, and/or instructions for handling various services and performing/coordinating hardware dependent tasks; network communications module 333 that includes procedures, data, and/or instructions, for, along with communication interface 322, connecting computing system 150 to other computing systems, such as user computing system(s) 100, computing system 160, and/or another computing system, and/or a network, such as network 130 of FIG. 1, and/or a database, such as database 170 of FIG. 1; network browser data module 335 that includes procedures, data, and/or instructions for obtaining and/or storing URL data from browser plug-in 237 of user computing system 100 to identify a given merchant associated with a given website; merchant/category association module 341 that includes procedures, data, and/or instructions for obtaining and/or storing data associating one or more merchants with one or more potential financial categories based, in one embodiment, on the merchandise and/or services offered by the one or more merchants; merchant/category analysis module 343 that includes procedures, data, and/or instructions for identifying one or more specific potential financial categories associated with a given merchant identified using the URL data from browser plug-in 237 of user computing system 100 and network browser data module 335; merchant/category data transmit module 345 that that includes procedures, data, and/or instructions for transmitting data associating one or more merchants with one or more potential financial categories based, in one embodiment, on the merchandise and/or services offered by the one or more merchants and identifying one or more specific potential financial categories associated with a given merchant identified using the URL data from browser plug-in 237 of user computing system 100 and network browser data module 335 to another computing system, such as user computing system 100 and/or merchant category data 241; and merchant/category refinement module 347 that includes procedures, data, and/or instructions for obtaining and/or storing refined data associating one or more merchants with one or more potential financial categories based, in one embodiment, on the merchandise and/or services offered by the one or more merchants and identifying one or more specific potential financial categories associated with a item and/or interface associated with a website of a given merchant identified using the URL data from browser plug-in 237 of user computing system 100 and network browser data module 335.

Those of skill in the art will readily recognize that the choice of components, data, modules, and information shown in FIG. 3, the organization of the components, data, modules, and information shown in FIG. 3, and the manner of storage and location of storage of the data, modules, and information shown in FIG. 3 was made for illustrative purposes only and that other choices of components, data, modules, and information, organization of the components, data, modules, and information, manner of storing, and location of storage, of the data, modules, and information can be implemented without departing from the scope of the invention as set forth in the claims below. In particular, the various modules and/or data shown in FIG. 3 are illustrative only and not limiting. In various other embodiments, the particular modules and/or data shown in FIG. 3 can be grouped together in fewer modules and/or data locations or divided among more modules and/or data locations. Consequently, those of skill in the art will recognize that other orders and/or grouping are possible and the particular modules and/or data, order, and/or grouping shown in FIG. 3 discussed herein do not limit the scope as claimed below.

A more detailed discussion of the operation of exemplary computing system 150 and computing system memory system 330 is provided below with respect to FIG. 5.

Figure 4:
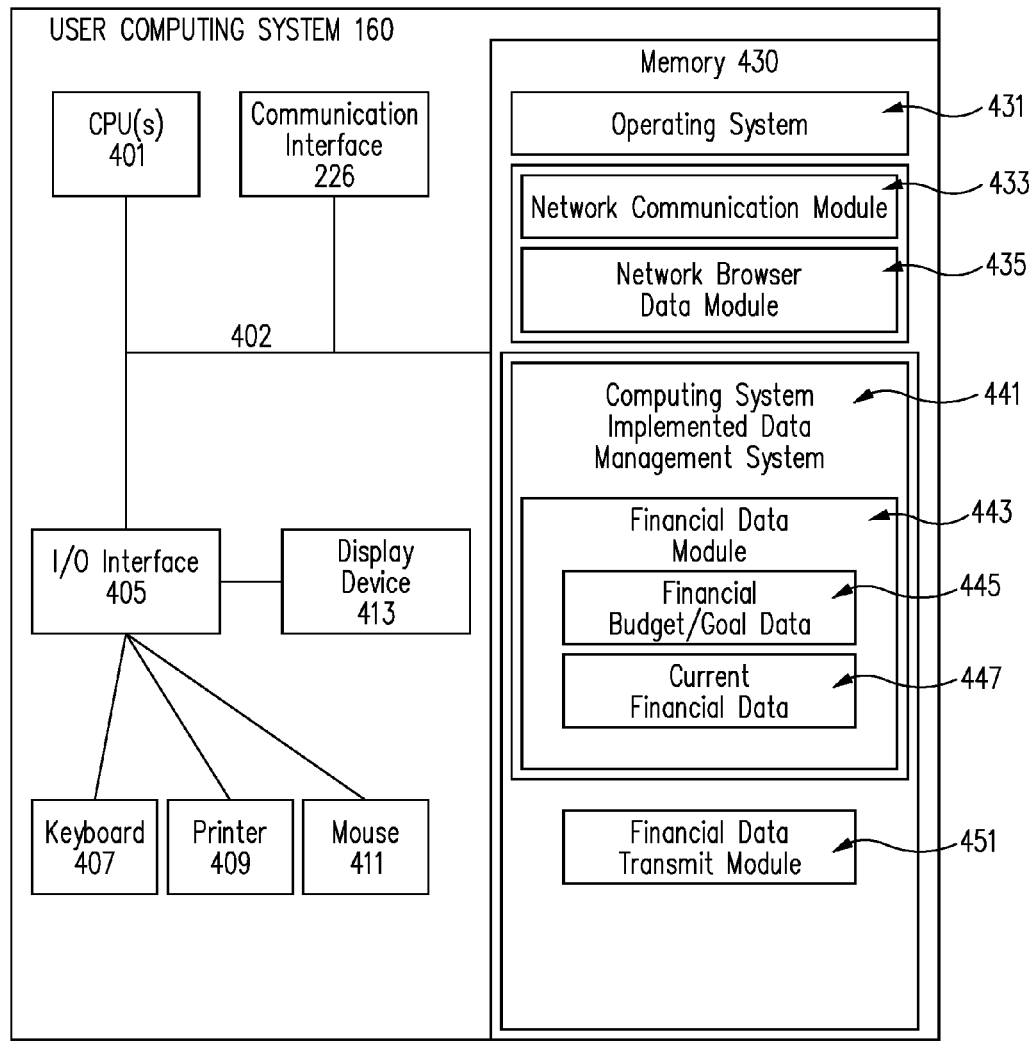
FIG. 4 is a block diagram of an exemplary computing system of FIG. 1, in accordance with one embodiment.

FIG. 4 is a more detailed block diagram of an exemplary computing system 160. As seen in FIG. 4, in one embodiment, computing system 160 includes one or more Central Processing Unit(s), CPU(s) 401; computing system memory system 430; at least one communication interface 226; an Input/Output interface, I/O interface 405, including one or more user interface devices such as display device 413, keyboard 407, printer 409, and/or mouse 411; all interconnected by one or more communication buses 402.

As also seen in FIG. 4, in one embodiment, computing system memory system 430 can store data and/or instructions associated with, but not limited to, the following elements, subsets of elements, and/or super sets of elements for use in processing by one or more processors, such as CPU(s) 201 (FIG. 2) and/or 301 (FIG. 3) and/or 401 (FIG. 4): operating system 431 that includes procedures, data, and/or instructions for handling various services and performing/coordinating hardware dependent tasks; network communications module 433 that includes procedures, data, and/or instructions, for, along with communication interface 422, connecting computing system 160 to other computing systems, such as user computing system(s) 100, computing system 150, and/or another computing system, and/or a network, such as network 130 of FIG. 1, and/or a database, such as database 170 of FIG. 1; network browser data module 435 that includes procedures, data, and/or instructions for obtaining and/or storing URL data from browser plug-in 237 of user computing system 100 to identify a given merchant associated with a given website; computing system implemented data management module 441 that includes procedures, data, and/or instructions associated with one or more computing system implemented data management systems, such as a computing system implemented personal financial management system or any computing system implemented data management system, as discussed herein, and/or as known in the art at the time of filing, and/or as developed after the time of filing; and financial data transmit module 452 that includes procedures, data, and/or instructions for transmitting financial data associated with a given user from computing system implemented data management module 441 to another computing system, such as user computing system 100 and/or financial data module 251.

As also seen in FIG. 4, computing system implemented data management module 441 includes financial budget/goal data 443 that includes procedures, data, and/or instructions for obtaining and/or storing financial budget/goal data indicating the given user's one or more budgetary and/or financial goals for one or more financial categories associated with a given merchant for a given period of time; and current financial data 447 that includes procedures, data, and/or instructions for obtaining and/or storing current financial data indicating a given user's actual spending potential financial categories associated with a given merchant for a given period of time.

Those of skill in the art will readily recognize that the choice of components, data, modules, and information shown in FIG. 4, the organization of the components, data, modules, and information shown in FIG. 4, and the manner of storage and location of storage of the data, modules, and information shown in FIG. 4 was made for illustrative purposes only and that other choices of components, data, modules, and information, organization of the components, data, modules, and information, manner of storing, and location of storage, of the data, modules, and information can be implemented without departing from the scope of the invention as set forth in the claims below. In particular, the various modules and/or data shown in FIG. 4 are illustrative only and not limiting. In various other embodiments, the particular modules and/or data shown in FIG. 4 can be grouped together in fewer modules and/or data locations or divided among more modules and/or data locations. Consequently, those of skill in the art will recognize that other orders and/or grouping are possible and the particular modules and/or data, order, and/or grouping shown in FIG. 4 discussed herein do not limit the scope as claimed below.

A more detailed discussion of the operation of exemplary computing system 160 and computing system memory system 430 is provided below with respect to FIG. 5.

In one embodiment, in order to monitor network activity, browser plug-in 237 of user computing system 100 of FIG. 2 includes a component that registers itself as an observer for HTTP-ON-MODIFY-REQUEST. Then, in one embodiment, when the user makes an http request via a user computing system, such as user computing system 100, the observer of browser plug-in 237 fires an event, which makes an AJAX request to second computing system, such as computing system 150, to find out if the website is associated with a supported merchant in merchant/category association data 341.

In one embodiment, the second computing system, such as computing system 150, processes the request, extracts the merchant name from the monitored URL of network browser 235 of user computing system 100 (FIG. 2), and/or network browser data module 335 of computing system 150 (FIG. 3), and looks up the (merchant/category) list of pairs for the resulting set of such processing using merchant/category analysis module 343.

In one embodiment, the second computing system, such as computing system 150, then sends a response back to the user computing system, such as user computing system 100, including a list of categories, in one embodiment a custom-made list of categories, for the given user and/or the given merchant.

In one embodiment, based on the response received from the second computing system, such as computing system 150, the user computing system, such as user computing system 100 initiate's connection with another computing system, such as computing system 160 (FIG. 4) to obtain the given user's financial data, such as data indicating one or more budgetary and/or financial goals for one or more financial categories for a given period of time and current financial data indicating the given user's actual spending in each of the potential financial categories associated with the given merchant for the given period of time.

In one embodiment, the user computing system, such as user computing system 100, then displays relevant remaining balance data for the potential financial categories associated with the given merchant for the given period of time on the same display as the user interface of the given merchant website that the user accessed.

In one embodiment, when, and if, the given user proceeds to the merchant's check out page, the user computing system, such as user computing system 100, sends a request to another computing system, such as computing systems 150 and/or 160, with data indicating the details, i.e., items, in the check out basket. In one embodiment, computing system, such as computing systems 150 and/or 160, processes the request and narrows the category set to only categories relevant to the check out basket.

A more detail discussion of various embodiments is provided below with respect to FIG. 5.

Process

Herein, the terms "given user" and/or "user", include any person, party, business, system, application, organization, and/or entity interacting with, interfacing with, contacting, viewing, providing data to, accepting data from, requesting data from, and/or otherwise associating with the process for providing real-time financial goal monitoring and analysis for any purpose. In addition, herein, the terms "individual" and/or "user" can be used interchangeably to denote any party using a process for providing real-time financial goal monitoring and analysis, and/or a person who is the subject of, source of, and/or target of, all, or part of, any data/information obtained and/or analysis performed by a process for providing real-time financial goal monitoring and analysis, and/or a legal guardian of a person who is the subject of, and/or target of, any data/information obtained and/or analysis performed by a process for providing real-time financial goal monitoring and analysis, and/or an authorized agent of any party using a process for providing real-time financial goal monitoring and analysis, and/or a person who is the subject of, and/or target of, any information obtained and/or analysis performed, by a process for providing real-time financial goal monitoring and analysis, and/or any other authorized party associated with any party using a process for providing real-time financial goal monitoring and analysis, and/or a person who is the subject of, and/or target of, any information obtained and/or analysis performed by a process for providing real-time financial goal monitoring and analysis.

Herein the term "financial institution" includes any entity, party, person, application and/or system, such as, but not limited to, banks, credit card companies, asset account companies, and/or investment firms, that engages in money/asset/debt management and/or financial transaction management/recording and/or display.

As used herein, the term "network" includes, but is not limited to, any network or network system such as, but not limited to, a peer-to-peer network, a hybrid peer-to-peer network, a Local Area Network (LAN), a Wide Area Network (WAN), a public network, such as the Internet, a private network, a cellular network, a combination of different network types, or other wireless, wired, and/or a wireless and wired combination network capable of allowing communication between two or more computing systems, whether available or known at the time of filing or as later developed.

As used herein, the term "database" includes, but is not limited to, any data storage mechanism known at the time of filing or as developed thereafter, such as, but not limited to: a data storage device; a designated server system or computing system, or a designated portion of one or more server systems or computing systems; a mobile computing system; a server system network; a distributed database; or an external and/or portable hard drive. Herein, the term "database" can refer to a dedicated mass storage device implemented in software, hardware, or a combination of hardware and software. Herein, the term "database" can refer to a web-based function. Herein, the term "database" can refer to any data storage means that is part of, or under the control of, any computing system, as defined herein, known at the time of filing, or as developed thereafter.

In accordance with one embodiment, a method and system for providing real-time financial goal monitoring and analysis includes a process for providing real-time financial goal monitoring and analysis whereby, in one embodiment, a given user defines one or more budgetary and/or financial goals for one or more financial categories for a given period of time. In one embodiment, a merchant/category database is created that associates one or more merchants with one or more potential financial categories based, in one embodiment, on the merchandise and/or services offered by the one or more merchants. In one embodiment, when a user accesses a given user interface of a website associated with a given merchant, URL data indicating the URL of the website being accessed is obtained and used to identify the given merchant associated with the given website. In one embodiment, once the given merchant is identified, the merchant/category database is searched to find one or more potential financial categories associated with the given merchant. In one embodiment, the financial budget/goal data indicating the given user's one or more budgetary and/or financial goals for the one or more financial categories associated with the given merchant for the given period of time is then obtained. In one embodiment, current financial data indicating the given user's actual spending in each of the potential financial categories associated with the given merchant for the given period of time also is obtained. In one embodiment, the financial budget/goal data indicating the given user's one or more budgetary and/or financial goals for the one or more financial categories associated with the given merchant for the given period of time and the current financial data indicating the given user's actual spending in each of the potential financial categories associated with the given merchant for the given period of time is analyzed/compared and the results of the analysis, including remaining balance data for one or more of the potential financial categories associated with the given merchant for the given period of time, is generated. In one embodiment, the remaining balance data for one or more of the potential financial categories associated with the given merchant for the given period of time is then displayed to the user in the same display screen displaying user interface of the given merchant website that the user accessed.

Figure 5:
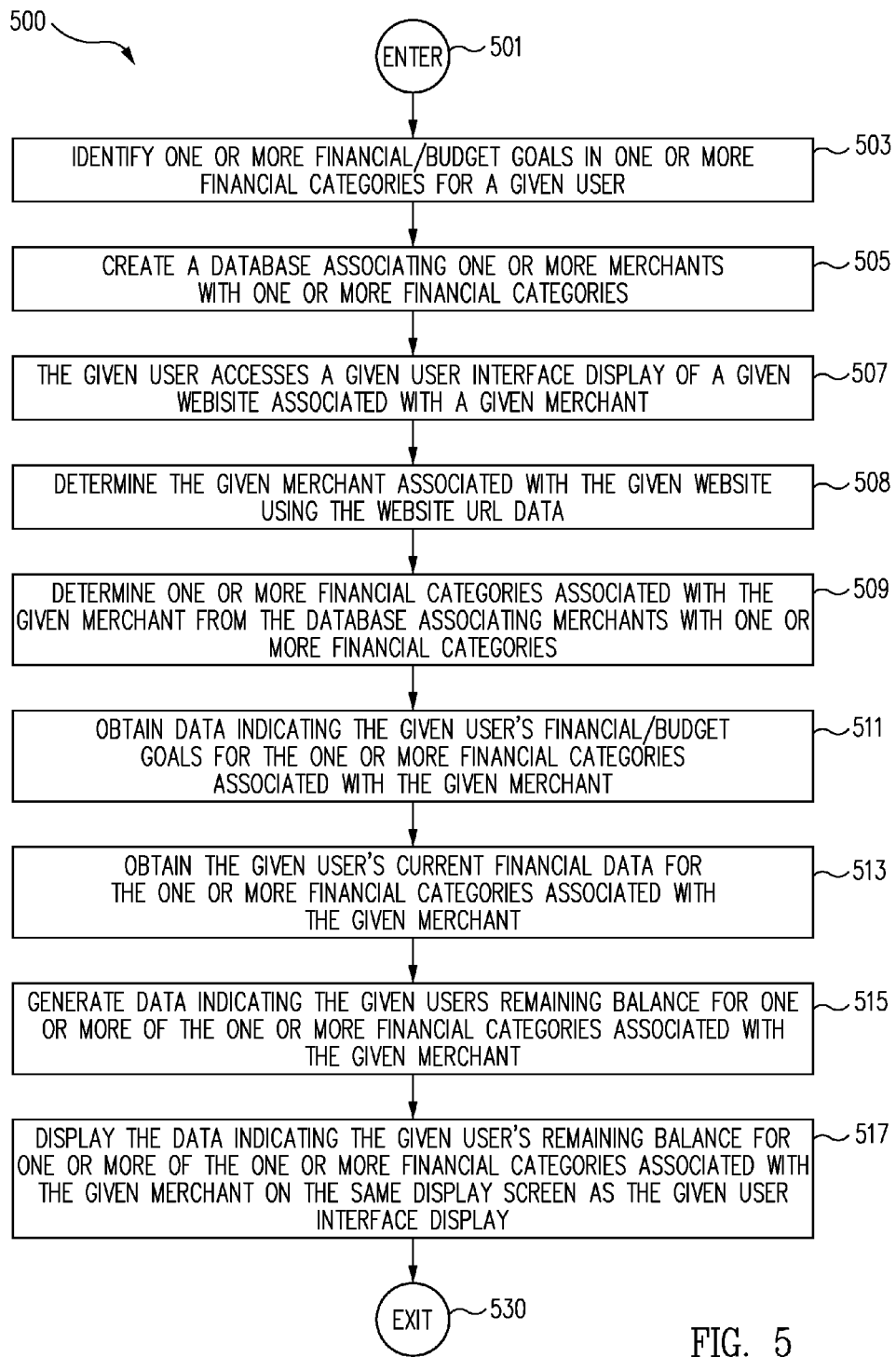
FIG. 5 is a flow chart depicting a process for providing real-time financial goal monitoring and analysis in accordance with one embodiment.

FIG. 5 is a flow chart depicting a process for providing real-time financial goal monitoring and analysis 500 in accordance with one embodiment. Process for providing real-time financial goal monitoring and analysis begins at ENTER OPERATION 501 of FIG. 5 and process flow proceeds to IDENTIFY ONE OR MORE FINANCIAL/BUDGET GOALS IN ONE OR MORE FINANCIAL CATEGORIES FOR A GIVEN USER OPERATION 503.

In one embodiment, at IDENTIFY ONE OR MORE FINANCIAL/BUDGET GOALS IN ONE OR MORE FINANCIAL CATEGORIES FOR A GIVEN USER OPERATION 503 a given user defines one or more budgetary and/or financial goals for one or more financial categories for a given period of time.

In one embodiment, the given period of time of IDENTIFY ONE OR MORE FINANCIAL/BUDGET GOALS IN ONE OR MORE FINANCIAL CATEGORIES FOR A GIVEN USER OPERATION 503 is any period of time defined/desired by the given user and/or a provider of process for providing real-time financial goal monitoring and analysis 500, such as, but not limited to: a week, two weeks, a month, a quarter, a year, etc.

In one embodiment, at IDENTIFY ONE OR MORE FINANCIAL/BUDGET GOALS IN ONE OR MORE FINANCIAL CATEGORIES FOR A GIVEN USER OPERATION 503 the given user defines one or more budgetary and/or financial goals for one or more financial categories for a given period of time using and/or through a computing system implemented data management system such as a computing system implemented personal financial management system.

In one embodiment, at IDENTIFY ONE OR MORE FINANCIAL/BUDGET GOALS IN ONE OR MORE FINANCIAL CATEGORIES FOR A GIVEN USER OPERATION 503 the given user defines one or more budgetary and/or financial goals for one or more financial categories for a given period of time using and/or through a computing system implemented data management system, such as a computing system implemented personal financial management system, implemented on a computing system, such as user computing system 100 of FIGS. 1 and 2 and/or computing systems 150 and/or 160 of FIGS. 1, 3 and 4. In one embodiment, the computing system implemented data management system is a computing system implemented data management system such as computing system implemented data management system 441 of FIG. 4.

As noted above, herein, a "computing system implemented financial management system" can be, but is not limited to, any data management system implemented on a computing system and/or accessed through a network that gathers financial data, including financial transactional data and/or has the capability to analyze and categorize at least part of the financial data. As used herein, the term computing system implemented financial management system includes, but is not limited to: computing system implemented personal and/or business financial management systems, packages, programs, modules, or applications; computing system implemented personal and/or business tax preparation systems, packages, programs, modules, or applications; computing system implemented personal and/or business accounting and/or invoicing systems, packages, programs, modules, or applications; and various other personal and/or business electronic data management systems, packages, programs, modules, or applications, whether known at the time of filing or as developed later.

Specific examples of computing system implemented financial management systems include, but are not limited to: Quicken™, available from Intuit Inc. of Mountain View, Calif.; Quicken Online™, available from Intuit Inc. of Mountain View, Calif.; Quickbooks™, available from Intuit Inc. of Mountain View, Calif.; Quicken Health Expense Manager™, available from Intuit Inc. of Mountain View, Calif.; Microsoft Money™, available from Microsoft, Inc. of Redmond, Wash.; Mint.com™, available from Intuit Inc. of Mountain View, Calif.; and/or various other computing system implemented financial management systems discussed herein, and/or known to those of skill in the art at the time of filing, and/or as developed after the time of filing.

Current computing system implemented financial management systems are typically software applications which, along with a parent computing system or device, help individuals/users manage their finances by providing a centralized interface with banks, credit card companies, asset account providers, mortgage companies, retirement account providers and other various financial and asset management institutions and/or accounts, for identifying, processing, storing, and categorizing user financial transactions. Currently, computing system implemented financial management systems typically obtain financial transaction information, such as payee identification, payee location, payment amount, date of the transaction, time of transaction, etc., via communication with banks, credit card providers, or other financial institutions, using data entry, links to databases, and electronic data transfer systems such as the Open Financial Exchange (OFX) specification or various systems for transferring financial transaction data.

Using computing system implemented financial management systems, the financial transaction information, payee identification, payee location, payment amount, date of the transaction, various tags and/or labels, and other data is used by the computing system implemented financial management system to categorize and/or tag individual financial transactions as a particular type of income or expense, to generate various financial reports, and to create an overview of the user's financial situation based on input from multiple, and often all, available sources of financial information regarding a user. Some currently offered computing system implemented financial management systems then use this financial transaction information to track events, such as purchase events, and to provide various historical personal and business data reports or displays including "to date" data reports, such as historical spending data reports in one or more particular categories and/or tagging schemes, as well as year-end personal and business tax, and/or asset, and/or general financial reports.

In various embodiments, at IDENTIFY ONE OR MORE FINANCIAL/BUDGET GOALS IN ONE OR MORE FINANCIAL CATEGORIES FOR A GIVEN USER OPERATION 503 the given user defines one or more budgetary and/or financial goals for one or more financial categories for a given period of time through, and/or the computing system implemented data management system is implemented on, one or more of: the given user's computing system; a computing system associated with the provider of the process for providing real-time financial goal monitoring and analysis; a computing system associated with the provider of the computing system implemented data management system; and/or a computing system associated with a third party.

In one embodiment, at IDENTIFY ONE OR MORE FINANCIAL/BUDGET GOALS IN ONE OR MORE FINANCIAL CATEGORIES FOR A GIVEN USER OPERATION 503 financial budget/goal data indicating the given user's one or more budgetary and/or financial goals for the one or more financial categories for the given period of time is associated with the given user, and the respective financial categories, and is then stored in whole, or in part, in any memory and/or database maintained by, accessible by, owned by, or otherwise related to, but not limited to, one or more of the following: a provider of the process for providing real-time financial goal monitoring and analysis; a provider of a computing system implemented data management system; one or more users; or any third party by any one of the numerous mechanisms known to those of skill in the art.

For instance, in various embodiments, the data, in whole, or in part, is stored in a memory system, such as memory systems 230, 330 and 430 of FIGS. 2, 3, and 4, or server memory system, or database, such as database 170 of FIG. 1, or in a cache memory, or in any main memory or mass memory, associated with a user computing system, such as user computing system 100 of FIGS. 1 and 2, and/or another computing system, such as computing systems 150 and 160 of FIGS. 1, 3, and 4, and/or a dedicated database, such as database 170 of FIG. 1. In one embodiment, the data, in whole, or in part, is stored in any computing system and/or server system, or other device, in another, remote, location, or on/in a computer readable medium, and/or any other computer program product, as defined herein. In one embodiment, the data, in whole, or in part, is stored on a webpage, in a web-based system or on a public network such as the Internet.

Returning to FIG. 5, in one embodiment, once a given user defines one or more budgetary and/or financial goals for one or more financial categories for a given period of time at IDENTIFY ONE OR MORE FINANCIAL/BUDGET GOALS IN ONE OR MORE FINANCIAL CATEGORIES FOR A GIVEN USER OPERATION 503, process flow proceeds to CREATE A DATABASE ASSOCIATING ONE OR MORE MERCHANTS WITH ONE OR MORE FINANCIAL CATEGORIES OPERATION 505.

In one embodiment, at CREATE A DATABASE ASSOCIATING ONE OR MORE MERCHANTS WITH ONE OR MORE FINANCIAL CATEGORIES OPERATION 505 a merchant/category database is created that associates one or more merchants with one or more potential financial categories based, in one embodiment, on the merchandise and/or services offered by the one or more merchants.

In one embodiment, at CREATE A DATABASE ASSOCIATING ONE OR MORE MERCHANTS WITH ONE OR MORE FINANCIAL CATEGORIES OPERATION 505 the merchant/category database that associates one or more merchants with one or more potential financial categories associated with the merchandise and/or services offered by the one or more merchants is implemented on, and/or created using, one or more of: the given user's computing system; a computing system associated with the provider of the process for providing real-time financial goal monitoring and analysis; a computing system associated with the provider of the computing system implemented data management system; and/or a computing system associated with a third party.

In one embodiment, at CREATE A DATABASE ASSOCIATING ONE OR MORE MERCHANTS WITH ONE OR MORE FINANCIAL CATEGORIES OPERATION 505 the merchant/category database is created, at least in part, using data from the one or more merchants themselves.

In one embodiment, at CREATE A DATABASE ASSOCIATING ONE OR MORE MERCHANTS WITH ONE OR MORE FINANCIAL CATEGORIES OPERATION 505 the merchant/category database is created, at least in part, using screen scraping technology and/or data mining techniques.

In one embodiment, at CREATE A DATABASE ASSOCIATING ONE OR MORE MERCHANTS WITH ONE OR MORE FINANCIAL CATEGORIES OPERATION 505 the merchant/category database is created, at least in part, using data provided by one or more users.

In one embodiment, at CREATE A DATABASE ASSOCIATING ONE OR MORE MERCHANTS WITH ONE OR MORE FINANCIAL CATEGORIES OPERATION 505 the merchant/category database is created, at least in part, using data provided by one or more computing system implemented data management systems.

In one embodiment, at CREATE A DATABASE ASSOCIATING ONE OR MORE MERCHANTS WITH ONE OR MORE FINANCIAL CATEGORIES OPERATION 505 the merchant/category database is created, at least in part, using data provided by one or more computing system implemented data management systems and/or one or more user's historical categorizations of transactions involving the one or more merchants.

In one embodiment, at CREATE A DATABASE ASSOCIATING ONE OR MORE MERCHANTS WITH ONE OR MORE FINANCIAL CATEGORIES OPERATION 505 the merchant/category database is created, at least in part, using data provided by one or more computing system implemented data management systems and/or the given user's historical categorizations of transactions involving the one or more merchants to create a merchant/category database customized to the given user.

In one embodiment, at CREATE A DATABASE ASSOCIATING ONE OR MORE MERCHANTS WITH ONE OR MORE FINANCIAL CATEGORIES OPERATION 505 the merchant/category database is created, at least in part, using data from any source of data that associates one or more merchants with one or more potential financial categories as discussed herein, and/or as known in the art at the time of filing, and/or as developed after the time of filing.

In one embodiment, once a merchant/category database is created that associates one or more merchants with one or more potential financial categories based, in one embodiment, on the merchandise and/or services offered by the one or more merchants at CREATE A DATABASE ASSOCIATING ONE OR MORE MERCHANTS WITH ONE OR MORE FINANCIAL CATEGORIES OPERATION 505, process flow proceeds to THE GIVEN USER ACCESSES A GIVEN USER INTERFACE DISPLAY OF A GIVEN WEBSITE ASSOCIATED WITH A GIVEN MERCHANT OPERATION 507.

In one embodiment, at THE GIVEN USER ACCESSES A GIVEN USER INTERFACE DISPLAY OF A GIVEN WEBSITE ASSOCIATED WITH A GIVEN MERCHANT OPERATION 507 the given user accesses a given user interface of a website associated with a given merchant.

In one embodiment, at THE GIVEN USER ACCESSES A GIVEN USER INTERFACE DISPLAY OF A GIVEN WEBSITE ASSOCIATED WITH A GIVEN MERCHANT OPERATION 507 the given user accesses a given user interface of a website associated with a given merchant via any user computing system as discussed herein, and/or as known in the art at the time of filing, and/or as developed after the time of filing. For instance, in one embodiment, at THE GIVEN USER ACCESSES A GIVEN USER INTERFACE DISPLAY OF A GIVEN WEBSITE ASSOCIATED WITH A GIVEN MERCHANT OPERATION 507 the given user accesses a given user interface of a website associated with a given merchant via one or more of: the given user's computing system; a computing system associated with the provider of the process for providing real-time financial goal monitoring and analysis; a computing system associated with the provider of the computing system implemented data management system; and/or a computing system associated with a third party.

In one embodiment, once the given user accesses a given user interface of a website associated with a given merchant at THE GIVEN USER ACCESSES A GIVEN USER INTERFACE DISPLAY OF A GIVEN WEBSITE ASSOCIATED WITH A GIVEN MERCHANT OPERATION 507, process flow proceeds to DETERMINE THE GIVEN MERCHANT ASSOCIATED WITH THE GIVEN WEBSITE USING THE WEBSITE URL DATA OPERATION 508.

In one embodiment, at DETERMINE THE GIVEN MERCHANT ASSOCIATED WITH THE GIVEN WEBSITE USING THE WEBSITE URL DATA OPERATION 508 when the given user accesses the given user interface of a website associated with a given merchant at THE GIVEN USER ACCESSES A GIVEN USER INTERFACE DISPLAY OF A GIVEN WEBSITE ASSOCIATED WITH A GIVEN MERCHANT OPERATION 507, data indicating the Uniform Resource Locator (URL) of the website being accessed is obtained and used to identify the given merchant associated with the given website.

In one embodiment, at DETERMINE THE GIVEN MERCHANT ASSOCIATED WITH THE GIVEN WEBSITE USING THE WEBSITE URL DATA OPERATION 508 the URL data indicating the URL of the website being accessed at THE GIVEN USER ACCESSES A GIVEN USER INTERFACE DISPLAY OF A GIVEN WEBSITE ASSOCIATED WITH A GIVEN MERCHANT OPERATION 507 is obtained via a web-browser plug-in to a web-browser, such as browser plug-in 237 of network browser module 235 of FIG. 2, implemented, at least in part on a user computing system, such as user computing system 100 of FIGS. 1 and 2.

In one embodiment, the web-browser plug-in includes a component that registers itself as an observer for HTTP-ON-MODIFY-REQUEST. In one embodiment, when the given user makes an http request at THE GIVEN USER ACCESSES A GIVEN USER INTERFACE DISPLAY OF A GIVEN WEBSITE ASSOCIATED WITH A GIVEN MERCHANT OPERATION 507, the web-browser plug-in observer fires an event to find out if the web-site is associated with a merchant supported and/or registered with process for providing real-time financial goal monitoring and analysis 500 and/or for which data is available. In one embodiment, a default list of major merchants is installed on, or is accessible by, a user computing system, such as user computing system 100, as merchant/category data, such as merchant/category data 241 of FIG. 2.

In one embodiment, at DETERMINE THE GIVEN MERCHANT ASSOCIATED WITH THE GIVEN WEBSITE USING THE WEBSITE URL DATA OPERATION 508 the URL data is used to identify the given merchant associated with the given website of THE GIVEN USER ACCESSES A GIVEN USER INTERFACE DISPLAY OF A GIVEN WEBSITE ASSOCIATED WITH A GIVEN MERCHANT OPERATION 507 using one or more processors associated with one or more of: the given user's computing system; a computing system associated with the provider of the process for providing real-time financial goal monitoring and analysis; a computing system associated with the provider of the computing system implemented data management system; and/or a computing system associated with a third party.

In one embodiment, once the given user accesses the given user interface of a website associated with a given merchant at THE GIVEN USER ACCESSES A GIVEN USER INTERFACE DISPLAY OF A GIVEN WEBSITE ASSOCIATED WITH A GIVEN MERCHANT OPERATION 507 and data indicating the URL of the website being accessed is obtained and used to identify the given merchant associated with the given website at DETERMINE THE GIVEN MERCHANT ASSOCIATED WITH THE GIVEN WEBSITE USING THE WEBSITE URL DATA OPERATION 508, process flow proceeds to DETERMINE ONE OR MORE FINANCIAL CATEGORIES ASSOCIATED WITH THE GIVEN MERCHANT FROM THE DATABASE ASSOCIATING MERCHANTS WITH ONE OR MORE FINANCIAL CATEGORIES OPERATION 509.

In one embodiment, at DETERMINE ONE OR MORE FINANCIAL CATEGORIES ASSOCIATED WITH THE GIVEN MERCHANT FROM THE DATABASE ASSOCIATING MERCHANTS WITH ONE OR MORE FINANCIAL CATEGORIES OPERATION 509 once the given merchant is identified at DETERMINE THE GIVEN MERCHANT ASSOCIATED WITH THE GIVEN WEBSITE USING THE WEBSITE URL DATA OPERATION 508, the merchant/category database of CREATE A DATABASE ASSOCIATING ONE OR MORE MERCHANTS WITH ONE OR MORE FINANCIAL CATEGORIES OPERATION 505 is searched to find one or more potential financial categories associated with the given merchant.

In one embodiment, at DETERMINE ONE OR MORE FINANCIAL CATEGORIES ASSOCIATED WITH THE GIVEN MERCHANT FROM THE DATABASE ASSOCIATING MERCHANTS WITH ONE OR MORE FINANCIAL CATEGORIES OPERATION 509 the merchant/category database of CREATE A DATABASE ASSOCIATING ONE OR MORE MERCHANTS WITH ONE OR MORE FINANCIAL CATEGORIES OPERATION 505 is searched to find one or more potential financial categories associated with the given merchant using, and/or under the direction of, one or more processors associated with one or more of: the given user's computing system; a computing system associated with the provider of the process for providing real-time financial goal monitoring and analysis; a computing system associated with the provider of the computing system implemented data management system; and/or a computing system associated with a third party.

In one embodiment, once the given merchant is identified at DETERMINE THE GIVEN MERCHANT ASSOCIATED WITH THE GIVEN WEBSITE USING THE WEBSITE URL DATA OPERATION 508 and the merchant/category database of CREATE A DATABASE ASSOCIATING ONE OR MORE MERCHANTS WITH ONE OR MORE FINANCIAL CATEGORIES OPERATION 505 is searched to find one or more potential financial categories associated with the given merchant at DETERMINE ONE OR MORE FINANCIAL CATEGORIES ASSOCIATED WITH THE GIVEN MERCHANT FROM THE DATABASE ASSOCIATING MERCHANTS WITH ONE OR MORE FINANCIAL CATEGORIES OPERATION 509, process flow proceeds to OBTAIN DATA INDICATING THE GIVEN USER'S FINANCIAL/BUDGET GOALS FOR THE ONE OR MORE FINANCIAL CATEGORIES ASSOCIATED WITH THE GIVEN MERCHANT OPERATION 511.

In one embodiment, at OBTAIN DATA INDICATING THE GIVEN USER'S FINANCIAL/BUDGET GOALS FOR THE ONE OR MORE FINANCIAL CATEGORIES ASSOCIATED WITH THE GIVEN MERCHANT OPERATION 511 the financial budget/goal data indicating the given user's one or more budgetary and/or financial goals for the one or more financial categories associated with the given merchant of DETERMINE ONE OR MORE FINANCIAL CATEGORIES ASSOCIATED WITH THE GIVEN MERCHANT FROM THE DATABASE ASSOCIATING MERCHANTS WITH ONE OR MORE FINANCIAL CATEGORIES OPERATION 509 for the given period of time is obtained from the stored data of IDENTIFY ONE OR MORE FINANCIAL/BUDGET GOALS IN ONE OR MORE FINANCIAL CATEGORIES FOR A GIVEN USER OPERATION 503.

In one embodiment, at OBTAIN DATA INDICATING THE GIVEN USER'S FINANCIAL/BUDGET GOALS FOR THE ONE OR MORE FINANCIAL CATEGORIES ASSOCIATED WITH THE GIVEN MERCHANT OPERATION 511 the financial budget/goal data indicating the given user's one or more budgetary and/or financial goals for the one or more financial categories associated with the given merchant of DETERMINE ONE OR MORE FINANCIAL CATEGORIES ASSOCIATED WITH THE GIVEN MERCHANT FROM THE DATABASE ASSOCIATING MERCHANTS WITH ONE OR MORE FINANCIAL CATEGORIES OPERATION 509 for the given period of time is obtained from the stored data of IDENTIFY ONE OR MORE FINANCIAL/BUDGET GOALS IN ONE OR MORE FINANCIAL CATEGORIES FOR A GIVEN USER OPERATION 503 using, and/or under the direction of, one or more processors associated with one or more of: the given user's computing system; a computing system associated with the provider of the process for providing real-time financial goal monitoring and analysis; a computing system associated with the provider of the computing system implemented data management system; and/or a computing system associated with a third party.

In one embodiment, once the financial budget/goal data indicating the given user's one or more budgetary and/or financial goals for the one or more financial categories associated with the given merchant of DETERMINE ONE OR MORE FINANCIAL CATEGORIES ASSOCIATED WITH THE GIVEN MERCHANT FROM THE DATABASE ASSOCIATING MERCHANTS WITH ONE OR MORE FINANCIAL CATEGORIES OPERATION 509 for the given period of time is obtained from the stored data of IDENTIFY ONE OR MORE FINANCIAL/BUDGET GOALS IN ONE OR MORE FINANCIAL CATEGORIES FOR A GIVEN USER OPERATION 503 at OBTAIN DATA INDICATING THE GIVEN USER'S FINANCIAL/BUDGET GOALS FOR THE ONE OR MORE FINANCIAL CATEGORIES ASSOCIATED WITH THE GIVEN MERCHANT OPERATION 511, process flow proceeds to OBTAIN THE GIVEN USER'S CURRENT FINANCIAL DATA FOR THE ONE OR MORE FINANCIAL CATEGORIES ASSOCIATED WITH THE GIVEN MERCHANT OPERATION 513.

In one embodiment, at OBTAIN THE GIVEN USER'S CURRENT FINANCIAL DATA FOR THE ONE OR MORE FINANCIAL CATEGORIES ASSOCIATED WITH THE GIVEN MERCHANT OPERATION 513 current financial data indicating the given user's actual spending in each of the potential financial categories associated with the given merchant of DETERMINE ONE OR MORE FINANCIAL CATEGORIES ASSOCIATED WITH THE GIVEN MERCHANT FROM THE DATABASE ASSOCIATING MERCHANTS WITH ONE OR MORE FINANCIAL CATEGORIES OPERATION 509 for the given period of time is obtained.

In one embodiment, at OBTAIN THE GIVEN USER'S CURRENT FINANCIAL DATA FOR THE ONE OR MORE FINANCIAL CATEGORIES ASSOCIATED WITH THE GIVEN MERCHANT OPERATION 513 at least part of current financial data indicating the given user's actual spending in each of the potential financial categories associated with the given merchant of DETERMINE ONE OR MORE FINANCIAL CATEGORIES ASSOCIATED WITH THE GIVEN MERCHANT FROM THE DATABASE ASSOCIATING MERCHANTS WITH ONE OR MORE FINANCIAL CATEGORIES OPERATION 509 for the given period of time is obtained from a computing system implemented data management system such as a computing system implemented personal financial management system, such as computing system implemented data management system 441 of computing system 160 of FIG. 4.

As noted above, herein, a "computing system implemented financial management system" can be, but is not limited to, any data management system implemented on a computing system and/or accessed through a network that gathers financial data, including financial transactional data and/or has the capability to analyze and categorize at least part of the financial data. As used herein, the term computing system implemented financial management system includes, but is not limited to: computing system implemented personal and/or business financial management systems, packages, programs, modules, or applications; computing system implemented personal and/or business tax preparation systems, packages, programs, modules, or applications; computing system implemented personal and/or business accounting and/or invoicing systems, packages, programs, modules, or applications; and various other personal and/or business electronic data management systems, packages, programs, modules, or applications, whether known at the time of filing or as developed later.

Specific examples of computing system implemented financial management systems include, but are not limited to: Quicken™, available from Intuit Inc. of Mountain View, Calif.; Quicken Online™, available from Intuit Inc. of Mountain View, Calif.; Quickbooks™, available from Intuit Inc. of Mountain View, Calif.; Quicken Health Expense Manager™, available from Intuit Inc. of Mountain View, Calif.; Microsoft Money™, available from Microsoft, Inc. of Redmond, Wash.; Mint.com™, available from Intuit Inc. of Mountain View, Calif.; and/or various other computing system implemented financial management systems discussed herein, and/or known to those of skill in the art at the time of filing, and/or as developed after the time of filing.

Current computing system implemented financial management systems are typically software applications which, along with a parent computing system or device, help individuals/users manage their finances by providing a centralized interface with banks, credit card companies, asset account providers, mortgage companies, retirement account providers and other various financial and asset management institutions and/or accounts, for identifying, processing, storing, and categorizing user financial transactions. Currently, computing system implemented financial management systems typically obtain financial transaction information, such as payee identification, payee location, payment amount, date of the transaction, time of transaction, etc., via communication with banks, credit card providers, or other financial institutions, using data entry, links to databases, and electronic data transfer systems such as the Open Financial Exchange (OFX) specification or various systems for transferring financial transaction data.

Using computing system implemented financial management systems, the financial transaction information, payee identification, payee location, payment amount, date of the transaction, various tags and/or labels, and other data is used by the computing system implemented financial management system to categorize and/or tag individual financial transactions as a particular type of income or expense, to generate various financial reports, and to create an overview of the user's financial situation based on input from multiple, and often all, available sources of financial information regarding a user. Some currently offered computing system implemented financial management systems then use this financial transaction information to track events, such as purchase events, and to provide various historical personal and business data reports or displays including "to date" data reports, such as historical spending data reports in one or more particular categories and/or tagging schemes, as well as year-end personal and business tax, and/or asset, and/or general financial reports.

In one embodiment, at OBTAIN THE GIVEN USER'S CURRENT FINANCIAL DATA FOR THE ONE OR MORE FINANCIAL CATEGORIES ASSOCIATED WITH THE GIVEN MERCHANT OPERATION 513 at least part of the current financial data indicating the given user's actual spending in each of the potential financial categories associated with the given merchant for the given period of time is provided to, and/or entered into, and/or transferred to, and/or downloaded to, and/or otherwise obtained by, process for providing real-time financial goal monitoring and analysis 500 and/or a computing system implemented data management system associated with process for providing real-time financial goal monitoring and analysis 500 from the user, one or more banks, one or more credit card companies, a credit reporting agency or bureau, and/or any other financial institution or data source via any network or network system, such as network 130 of FIG. 1 and/or as discussed herein, and/or available or known at the time of filing, and/or as later developed.

In one embodiment, at OBTAIN THE GIVEN USER'S CURRENT FINANCIAL DATA FOR THE ONE OR MORE FINANCIAL CATEGORIES ASSOCIATED WITH THE GIVEN MERCHANT OPERATION 513 at least part of the current financial data indicating the given user's actual spending in each of the potential financial categories associated with the given merchant for the given period of time is provided to, and/or entered into, and/or transferred to, and/or downloaded to, and/or otherwise obtained by, process for providing real-time financial goal monitoring and analysis 500, and/or a computing system implemented data management system associated with process for providing real-time financial goal monitoring and analysis 500, from the user, a bank, a credit card company, a credit reporting agency or bureau, and/or any other financial institution or data source through a user interface device, such as a keyboard, mouse, touchpad, voice recognition software, or any other device and/or system capable of providing user input to a computing system and/or for translating user actions into computing system operations, whether available or known at the time of filing or as developed later.

In one embodiment, at OBTAIN THE GIVEN USER'S CURRENT FINANCIAL DATA FOR THE ONE OR MORE FINANCIAL CATEGORIES ASSOCIATED WITH THE GIVEN MERCHANT OPERATION 513 at least part of the current financial data indicating the given user's actual spending in each of the potential financial categories associated with the given merchant for the given period of time is provided to, and/or entered into, and/or transferred to, and/or downloaded to, and/or otherwise obtained by, process for providing real-time financial goal monitoring and analysis 500, and/or a computing system implemented data management system associated with process for providing real-time financial goal monitoring and analysis 500, from a database, such as database 170 of FIG. 1, maintained by the user, a bank, a credit card company, a credit reporting agency or bureau, and/or any other financial institution or data source, as discussed herein, and/or available or known at the time of filing, and/or as later developed.

In one embodiment, at OBTAIN THE GIVEN USER'S CURRENT FINANCIAL DATA FOR THE ONE OR MORE FINANCIAL CATEGORIES ASSOCIATED WITH THE GIVEN MERCHANT OPERATION 513 at least part of the current financial data indicating the given user's actual spending in each of the potential financial categories associated with the given merchant for the given period of time is provided to, and/or entered into, and/or transferred to, and/or downloaded to, and/or otherwise obtained by, process for providing real-time financial goal monitoring and analysis 500, and/or a computing system implemented data management system associated with process for providing real-time financial goal monitoring and analysis 500, from the user, a bank, a credit card company, a credit reporting agency or bureau, and/or any other financial institution or data source by embedding the data in, or on, a computer program product, as defined herein and providing the computer program product to the provider of computing system implemented financial management system associated with process for providing real-time financial goal monitoring and analysis 500 and/or process for providing real-time financial goal monitoring and analysis 500.

In one embodiment, at OBTAIN THE GIVEN USER'S CURRENT FINANCIAL DATA FOR THE ONE OR MORE FINANCIAL CATEGORIES ASSOCIATED WITH THE GIVEN MERCHANT OPERATION 513 at least part of the current financial data indicating the given user's actual spending in each of the potential financial categories associated with the given merchant for the given period of time is provided to, and/or entered into, and/or transferred to, and/or downloaded to, and/or otherwise obtained by, process for providing real-time financial goal monitoring and analysis 500, and/or a computing system implemented data management system associated with process for providing real-time financial goal monitoring and analysis 500, from the user, a bank, a credit card company, a credit reporting agency or bureau, and/or any other financial institution or data source by any method, apparatus, process or mechanism for transferring data from one or more devices, computing systems, server systems, databases, web site/web functions and/or any devices having a data storage capability to one or more other devices, computing systems, server systems, databases, web site/web functions and/or any devices having a data storage capability, whether known at the time of filing or as thereafter developed.

In one embodiment, once current financial data indicating the given user's actual spending in each of the potential financial categories associated with the given merchant of DETERMINE ONE OR MORE FINANCIAL CATEGORIES ASSOCIATED WITH THE GIVEN MERCHANT FROM THE DATABASE ASSOCIATING MERCHANTS WITH ONE OR MORE FINANCIAL CATEGORIES OPERATION 509 for the given period of time is obtained at OBTAIN THE GIVEN USER'S CURRENT FINANCIAL DATA FOR THE ONE OR MORE FINANCIAL CATEGORIES ASSOCIATED WITH THE GIVEN MERCHANT OPERATION 513, process flow proceeds to GENERATE DATA INDICATING THE GIVEN USERS REMAINING BALANCE FOR ONE OR MORE OF THE ONE OR MORE FINANCIAL CATEGORIES ASSOCIATED WITH THE GIVEN MERCHANT OPERATION 515.

In one embodiment, at GENERATE DATA INDICATING THE GIVEN USERS REMAINING BALANCE FOR ONE OR MORE OF THE ONE OR MORE FINANCIAL CATEGORIES ASSOCIATED WITH THE GIVEN MERCHANT OPERATION 515 the financial budget/goal data indicating the given user's one or more budgetary and/or financial goals for the one or more financial categories associated with the given merchant for the given period of time of OBTAIN DATA INDICATING THE GIVEN USER'S FINANCIAL/BUDGET GOALS FOR THE ONE OR MORE FINANCIAL CATEGORIES ASSOCIATED WITH THE GIVEN MERCHANT OPERATION 511 and the current financial data indicating the given user's actual spending in each of the potential financial categories associated with the given merchant for the given period of time of OBTAIN THE GIVEN USER'S CURRENT FINANCIAL DATA FOR THE ONE OR MORE FINANCIAL CATEGORIES ASSOCIATED WITH THE GIVEN MERCHANT OPERATION 513 is analyzed/compared and the results of the analysis, including remaining balance data for one or more of the potential financial categories associated with the given merchant for the given period of time, is generated.

In one embodiment, at GENERATE DATA INDICATING THE GIVEN USERS REMAINING BALANCE FOR ONE OR MORE OF THE ONE OR MORE FINANCIAL CATEGORIES ASSOCIATED WITH THE GIVEN MERCHANT OPERATION 515 the financial budget/goal data indicating the given user's one or more budgetary and/or financial goals for the one or more financial categories associated with the given merchant for the given period of time of OBTAIN DATA INDICATING THE GIVEN USER'S FINANCIAL/BUDGET GOALS FOR THE ONE OR MORE FINANCIAL CATEGORIES ASSOCIATED WITH THE GIVEN MERCHANT OPERATION 511 and the current financial data indicating the given user's actual spending in each of the potential financial categories associated with the given merchant for the given period of time of OBTAIN THE GIVEN USER'S CURRENT FINANCIAL DATA FOR THE ONE OR MORE FINANCIAL CATEGORIES ASSOCIATED WITH THE GIVEN MERCHANT OPERATION 513 is analyzed/compared using, or under the direction of, one or more processors associated with one or more of: the given user's computing system; a computing system associated with the provider of the process for providing real-time financial goal monitoring and analysis; a computing system associated with the provider of the computing system implemented data management system; and/or a computing system associated with a third party.

In one embodiment, at GENERATE DATA INDICATING THE GIVEN USERS REMAINING BALANCE FOR ONE OR MORE OF THE ONE OR MORE FINANCIAL CATEGORIES ASSOCIATED WITH THE GIVEN MERCHANT OPERATION 515 the difference between the given user's one or more budgetary and/or financial goals for the one or more financial categories associated with the given merchant for the given period of time and the current financial data indicating the given user's actual spending in each of the potential financial categories associated with the given merchant for the given period of time is calculated using, or under the direction of, one or more processors associated with one or more of: the given user's computing system; a computing system associated with the provider of the process for providing real-time financial goal monitoring and analysis; a computing system associated with the provider of the computing system implemented data management system; and/or a computing system associated with a third party.

In one embodiment, at GENERATE DATA INDICATING THE GIVEN USERS REMAINING BALANCE FOR ONE OR MORE OF THE ONE OR MORE FINANCIAL CATEGORIES ASSOCIATED WITH THE GIVEN MERCHANT OPERATION 515 remaining balance data for one or more of the potential financial categories associated with the given merchant for the given period of time is then generated using, or under the direction of, one or more processors associated with one or more of: the given user's computing system; a computing system associated with the provider of the process for providing real-time financial goal monitoring and analysis; a computing system associated with the provider of the computing system implemented data management system; and/or a computing system associated with a third party.

In one embodiment, once the financial budget/goal data indicating the given user's one or more budgetary and/or financial goals for the one or more financial categories associated with the given merchant for the given period of time of OBTAIN DATA INDICATING THE GIVEN USER'S FINANCIAL/BUDGET GOALS FOR THE ONE OR MORE FINANCIAL CATEGORIES ASSOCIATED WITH THE GIVEN MERCHANT OPERATION 511 and the current financial data indicating the given user's actual spending in each of the potential financial categories associated with the given merchant for the given period of time of OBTAIN THE GIVEN USER'S CURRENT FINANCIAL DATA FOR THE ONE OR MORE FINANCIAL CATEGORIES ASSOCIATED WITH THE GIVEN MERCHANT OPERATION 513 is analyzed/compared and the results of the analysis, including remaining balance data for one or more of the potential financial categories associated with the given merchant for the given period of time, is generated at GENERATE DATA INDICATING THE GIVEN USERS REMAINING BALANCE FOR ONE OR MORE OF THE ONE OR MORE FINANCIAL CATEGORIES ASSOCIATED WITH THE GIVEN MERCHANT OPERATION 515, process flow proceeds to DISPLAY THE DATA INDICATING THE GIVEN USER'S REMAINING BALANCE FOR ONE OR MORE OF THE ONE OR MORE FINANCIAL CATEGORIES ASSOCIATED WITH THE GIVEN MERCHANT ON THE SAME DISPLAY SCREEN AS THE GIVEN USER INTERFACE DISPLAY OPERATION 517.

In one embodiment, at DISPLAY THE DATA INDICATING THE GIVEN USER'S REMAINING BALANCE FOR ONE OR MORE OF THE ONE OR MORE FINANCIAL CATEGORIES ASSOCIATED WITH THE GIVEN MERCHANT ON THE SAME DISPLAY SCREEN AS THE GIVEN USER INTERFACE DISPLAY OPERATION 517 the remaining balance data for one or more of the potential financial categories associated with the given merchant for the given period of time of at GENERATE DATA INDICATING THE GIVEN USERS REMAINING BALANCE FOR ONE OR MORE OF THE ONE OR MORE FINANCIAL CATEGORIES ASSOCIATED WITH THE GIVEN MERCHANT OPERATION 515 is displayed to the user in the same display including the user interface of the given merchant website that the user accessed at THE GIVEN USER ACCESSES A GIVEN USER INTERFACE DISPLAY OF A GIVEN WEBSITE ASSOCIATED WITH A GIVEN MERCHANT OPERATION 507.

In one embodiment, at DISPLAY THE DATA INDICATING THE GIVEN USER'S REMAINING BALANCE FOR ONE OR MORE OF THE ONE OR MORE FINANCIAL CATEGORIES ASSOCIATED WITH THE GIVEN MERCHANT ON THE SAME DISPLAY SCREEN AS THE GIVEN USER INTERFACE DISPLAY OPERATION 517 the remaining balance data for one or more of the potential financial categories associated with the given merchant for the given period of time is displayed to the user using and/or under the direction of, one or more processors associated with one or more of: the given user's computing system; a computing system associated with the provider of the process for providing real-time financial goal monitoring and analysis; a computing system associated with the provider of the computing system implemented data management system; and/or a computing system associated with a third party.

In one embodiment, at DISPLAY THE DATA INDICATING THE GIVEN USER'S REMAINING BALANCE FOR ONE OR MORE OF THE ONE OR MORE FINANCIAL CATEGORIES ASSOCIATED WITH THE GIVEN MERCHANT ON THE SAME DISPLAY SCREEN AS THE GIVEN USER INTERFACE DISPLAY OPERATION 517 the remaining balance data for one or more of the potential financial categories associated with the given merchant for the given period of time is displayed to the user in the same display screen displaying user interface of the given merchant website that the user accessed and/or on: the given user's computing system; a computing system associated with the provider of the process for providing real-time financial goal monitoring and analysis; a computing system associated with the provider of the computing system implemented data management system; and/or a computing system associated with a third party.

In one embodiment, at DISPLAY THE DATA INDICATING THE GIVEN USER'S REMAINING BALANCE FOR ONE OR MORE OF THE ONE OR MORE FINANCIAL CATEGORIES ASSOCIATED WITH THE GIVEN MERCHANT ON THE SAME DISPLAY SCREEN AS THE GIVEN USER INTERFACE DISPLAY OPERATION 517 the remaining balance data for one or more of the potential financial categories associated with the given merchant for the given period of time is displayed to the user in the same display screen displaying user interface of the given merchant website that the user accessed in the form of any table, symbol, or graphical display. As an example, a table, a ledger, a thermometer, a sliding scale, any graphical representation, or any partially filled figure or symbol, or outline thereof, may be used. Moreover, these symbols, graphical displays, and scales may, in some embodiments, display the user's used funds, and/or unused funds, and/or the differential between the user's current spending and the identified financial goals.

In one embodiment, at DISPLAY THE DATA INDICATING THE GIVEN USER'S REMAINING BALANCE FOR ONE OR MORE OF THE ONE OR MORE FINANCIAL CATEGORIES ASSOCIATED WITH THE GIVEN MERCHANT ON THE SAME DISPLAY SCREEN AS THE GIVEN USER INTERFACE DISPLAY OPERATION 517 as the given user navigates within the given website associated with the given merchant of THE GIVEN USER ACCESSES A GIVEN USER INTERFACE DISPLAY OF A GIVEN WEBSITE ASSOCIATED WITH A GIVEN MERCHANT OPERATION 507, the potential financial categories associated with the given merchant of DETERMINE ONE OR MORE FINANCIAL CATEGORIES ASSOCIATED WITH THE GIVEN MERCHANT FROM THE DATABASE ASSOCIATING MERCHANTS WITH ONE OR MORE FINANCIAL CATEGORIES OPERATION 509 are refined, updated, and/or narrowed to reflect only the specific financial categories associated with the specific interface of the given website being viewed and the remaining balance data for one or more of the potential financial categories associated with the given merchant for the given period of time of DISPLAY THE DATA INDICATING THE GIVEN USER'S REMAINING BALANCE FOR ONE OR MORE OF THE ONE OR MORE FINANCIAL CATEGORIES ASSOCIATED WITH THE GIVEN MERCHANT ON THE SAME DISPLAY SCREEN AS THE GIVEN USER INTERFACE DISPLAY OPERATION 517 is also refined, updated, and/or narrowed to reflect only the specific financial categories associated with the specific interface of the given website being viewed.

In addition, in various embodiments, as the given user selects specific items within the given website associated with the given merchant of THE GIVEN USER ACCESSES A GIVEN USER INTERFACE DISPLAY OF A GIVEN WEBSITE ASSOCIATED WITH A GIVEN MERCHANT OPERATION 507, the potential financial categories associated with the given merchant of DETERMINE ONE OR MORE FINANCIAL CATEGORIES ASSOCIATED WITH THE GIVEN MERCHANT FROM THE DATABASE ASSOCIATING MERCHANTS WITH ONE OR MORE FINANCIAL CATEGORIES OPERATION 509 are refined, updated, and/or narrowed to reflect only the specific financial categories associated with the item selected and the remaining balance data for one or more of the potential financial categories associated with the given merchant for the given period of time of DISPLAY THE DATA INDICATING THE GIVEN USER'S REMAINING BALANCE FOR ONE OR MORE OF THE ONE OR MORE FINANCIAL CATEGORIES ASSOCIATED WITH THE GIVEN MERCHANT ON THE SAME DISPLAY SCREEN AS THE GIVEN USER INTERFACE DISPLAY OPERATION 517 is also refined, updated, and/or narrowed to reflect only the specific financial categories associated with the item selected.

In addition, in various embodiments, as the given user places specific items within the given website associated with the given merchant of THE GIVEN USER ACCESSES A GIVEN USER INTERFACE DISPLAY OF A GIVEN WEBSITE ASSOCIATED WITH A GIVEN MERCHANT OPERATION 507 in his or her shopping cart, the potential financial categories associated with the given merchant of DETERMINE ONE OR MORE FINANCIAL CATEGORIES ASSOCIATED WITH THE GIVEN MERCHANT FROM THE DATABASE ASSOCIATING MERCHANTS WITH ONE OR MORE FINANCIAL CATEGORIES OPERATION 509 are refined, updated, and/or narrowed to reflect only the specific financial categories associated with the items placed in the shopping cart and the remaining balance data for one or more of the potential financial categories associated with the given merchant for the given period of time of DISPLAY THE DATA INDICATING THE GIVEN USER'S REMAINING BALANCE FOR ONE OR MORE OF THE ONE OR MORE FINANCIAL CATEGORIES ASSOCIATED WITH THE GIVEN MERCHANT ON THE SAME DISPLAY SCREEN AS THE GIVEN USER INTERFACE DISPLAY OPERATION 517 is also refined, updated, and/or narrowed to reflect only the specific financial categories associated with the items placed in the shopping cart.

In one embodiment, once the remaining balance data for one or more of the potential financial categories associated with the given merchant for the given period of time of at GENERATE DATA INDICATING THE GIVEN USERS REMAINING BALANCE FOR ONE OR MORE OF THE ONE OR MORE FINANCIAL CATEGORIES ASSOCIATED WITH THE GIVEN MERCHANT OPERATION 515 is displayed to the user in the same display including the user interface of the given merchant website that the user accessed at THE GIVEN USER ACCESSES A GIVEN USER INTERFACE DISPLAY OF A GIVEN WEBSITE ASSOCIATED WITH A GIVEN MERCHANT OPERATION 507 at DISPLAY THE DATA INDICATING THE GIVEN USER'S REMAINING BALANCE FOR ONE OR MORE OF THE ONE OR MORE FINANCIAL CATEGORIES ASSOCIATED WITH THE GIVEN MERCHANT ON THE SAME DISPLAY SCREEN AS THE GIVEN USER INTERFACE DISPLAY OPERATION 517, process flow proceeds to EXIT OPERATION 530. In one embodiment, at EXIT OPERATION 530, process for providing real-time financial goal monitoring and analysis 500 is exited to await new data.

Figure 7:
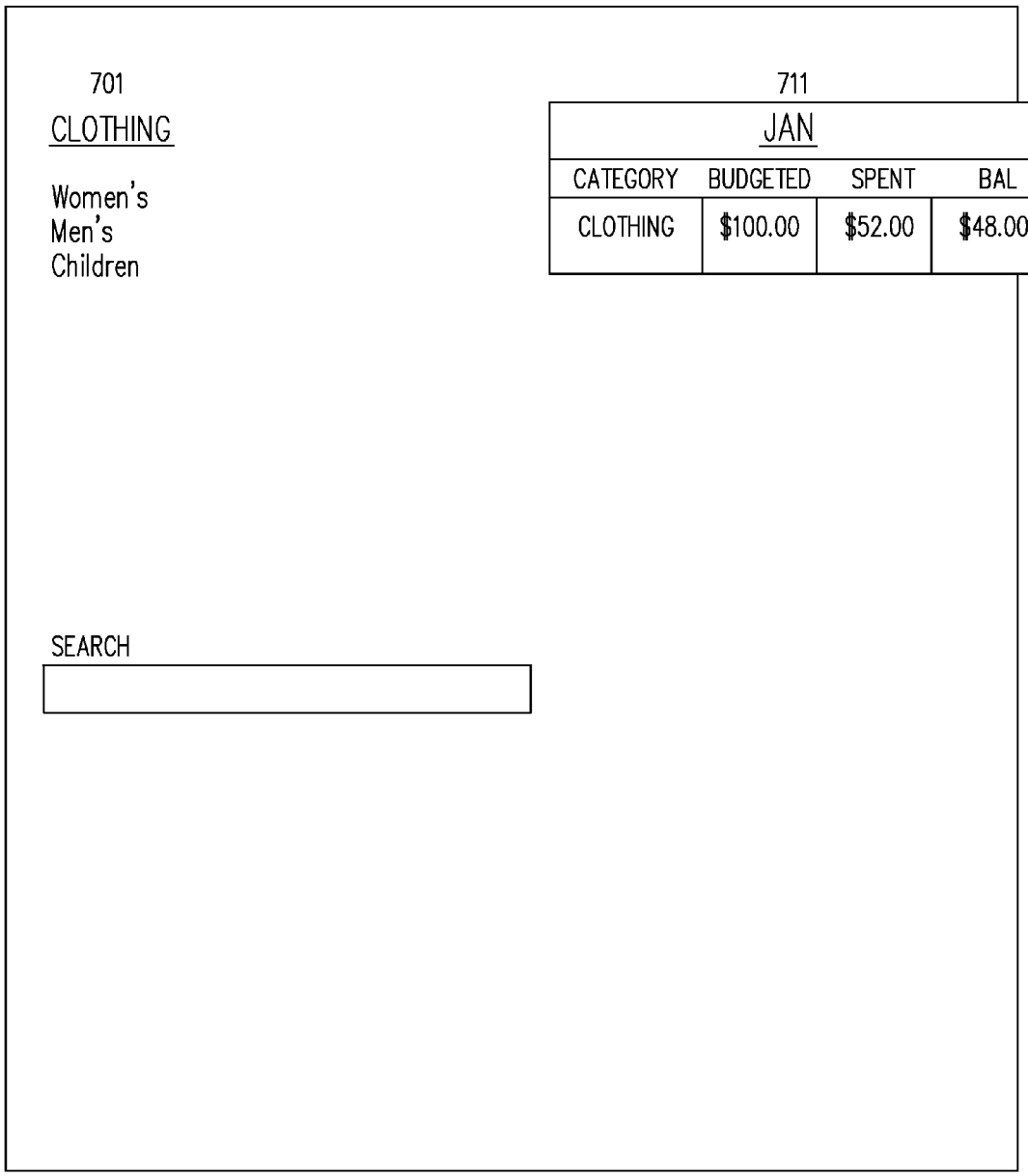
FIG. 7 is an exemplary user interface screen associated with a merchant website and including a refined remaining balance data display in accordance with one embodiment.

FIGS. 6 and 7 show exemplary user interface screens associated with a merchant website, including a remaining balance data display 611 and/or 711, in accordance with a specific illustrative example of one embodiment.

Referring to FIGS. 5, 6, and 7, in this specific illustrative example of one embodiment it is postulated that at IDENTIFY ONE OR MORE FINANCIAL/BUDGET GOALS IN ONE OR MORE FINANCIAL CATEGORIES FOR A GIVEN USER OPERATION 503 the given user defines one or more budgetary and/or financial goals for the financial categories of school supplies, entertainment, clothing and home maintenance such that: the financial category of school supplies is allotted $100.00 for the month of January; the financial category of entertainment is allotted $200.00 for the month of January; the financial category of clothing is allotted $100.00 for the month of January; and the financial category of home maintenance is allotted $100.00 for the month of January.

In this specific example, it is further stipulated that, in January, the given user has already spent money in the financial categories as follows: $60.72 in the financial category of school supplies; $100.87 in the financial category of entertainment; $52.00 in the financial category of clothing; and $0.00 in the financial category of home maintenance.

In this specific example, it is further stipulated that at CREATE A DATABASE ASSOCIATING ONE OR MORE MERCHANTS WITH ONE OR MORE FINANCIAL CATEGORIES OPERATION 505, a merchant/category database is created that associates the given merchant "ONLINE SHOPPING NETWORK" with the potential financial categories of school supplies, entertainment, clothing, and home maintenance that reflect the merchandise and/or services offered by the given merchant "ONLINE SHOPPING NETWORK" as listed in departments listing 601.

As seen in FIG. 6, in this specific example, at THE GIVEN USER ACCESSES A GIVEN USER INTERFACE DISPLAY OF A GIVEN WEBSITE ASSOCIATED WITH A GIVEN MERCHANT OPERATION 507 the given user accesses a user interface 600 of a website associated with the given merchant "ONLINE SHOPPING NETWORK" and that, as shown in departments listing 601, the given merchant "ONLINE SHOPPING NETWORK" sells books, DVDs, clothing, and hardware.

In this specific example, at DETERMINE THE GIVEN MERCHANT ASSOCIATED WITH THE GIVEN WEBSITE USING THE WEBSITE URL DATA OPERATION 508 URL data indicating the URL of the given merchant "ONLINE SHOPPING NETWORK" is obtained and used to identify the given merchant as "ONLINE SHOPPING NETWORK".

In this specific example, in one embodiment, the given merchant is identified as "ONLINE SHOPPING NETWORK", and the merchant/category database of CREATE A DATABASE ASSOCIATING ONE OR MORE MERCHANTS WITH ONE OR MORE FINANCIAL CATEGORIES OPERATION 505 is searched to find the one or more potential financial categories associated with "ONLINE SHOPPING NETWORK" at DETERMINE ONE OR MORE FINANCIAL CATEGORIES ASSOCIATED WITH THE GIVEN MERCHANT FROM THE DATABASE ASSOCIATING MERCHANTS WITH ONE OR MORE FINANCIAL CATEGORIES OPERATION 509.

In this specific example, at DETERMINE ONE OR MORE FINANCIAL CATEGORIES ASSOCIATED WITH THE GIVEN MERCHANT FROM THE DATABASE ASSOCIATING MERCHANTS WITH ONE OR MORE FINANCIAL CATEGORIES OPERATION 509 the one or more potential financial categories associated with "ONLINE SHOPPING NETWORK", are school supplies, entertainment, clothing, and home maintenance.

In this specific example, at OBTAIN DATA INDICATING THE GIVEN USER'S FINANCIAL/BUDGET GOALS FOR THE ONE OR MORE FINANCIAL CATEGORIES ASSOCIATED WITH THE GIVEN MERCHANT OPERATION 511 the financial budget/goal data indicating the given user's one or more budgetary and/or financial goals for the financial categories school supplies, entertainment, clothing, and home maintenance, is obtained.

In this specific example, at OBTAIN THE GIVEN USER'S CURRENT FINANCIAL DATA FOR THE ONE OR MORE FINANCIAL CATEGORIES ASSOCIATED WITH THE GIVEN MERCHANT OPERATION 513 current financial data indicating the given user's actual spending in each of the potential financial categories of school supplies, entertainment, clothing, and home maintenance, for January is obtained. Specifically, data indicating the spending discussed above of $60.72 in the financial category of school supplies, $100.87 in the financial category of entertainment, $52.00 in the financial category of clothing, and $0.00 in the financial category of home maintenance for January is obtained.

In this specific example, at GENERATE DATA INDICATING THE GIVEN USERS REMAINING BALANCE FOR ONE OR MORE OF THE ONE OR MORE FINANCIAL CATEGORIES ASSOCIATED WITH THE GIVEN MERCHANT OPERATION 515 the financial budget/goal data indicating the given user's one or more budgetary and/or financial goals for the one or more financial categories of school supplies, entertainment, clothing, and home maintenance, associated with the given merchant "ONLINE SHOPPING NETWORK" for the given period of January and the current financial data indicating the given user's actual spending in each of the potential financial categories of school supplies, entertainment, clothing, and home maintenance, associated with the given merchant "ONLINE SHOPPING NETWORK" for the given period of January is analyzed/compared and the results of the analysis, including remaining balance data for one or more of the potential financial categories of school supplies, entertainment, clothing, and home maintenance, associated with the given merchant "ONLINE SHOPPING NETWORK" for the given period of January, is generated.

As seen in FIG. 6, in this specific example, at DISPLAY THE DATA INDICATING THE GIVEN USER'S REMAINING BALANCE FOR ONE OR MORE OF THE ONE OR MORE FINANCIAL CATEGORIES ASSOCIATED WITH THE GIVEN MERCHANT ON THE SAME DISPLAY SCREEN AS THE GIVEN USER INTERFACE DISPLAY OPERATION 517 the remaining balance data for one or more of the potential financial categories of school supplies, entertainment, clothing, and home maintenance, associated with the given merchant "ONLINE SHOPPING NETWORK" for the given period of January is displayed in remaining balance data display 611 of display 600 that also includes the given user interface of the given website associated with the merchant "ONLINE SHOPPING NETWORK", that the given user accessed at THE GIVEN USER ACCESSES A GIVEN USER INTERFACE DISPLAY OF A GIVEN WEBSITE ASSOCIATED WITH A GIVEN MERCHANT OPERATION 507.

As seen in FIG. 6, in this specific example, remaining balance data display 611 of display 600 includes a listing of the one or more potential financial categories associated with the merchant "ONLINE SHOPPING NETWORK", of school supplies, entertainment, clothing, and home maintenance from DETERMINE ONE OR MORE FINANCIAL CATEGORIES ASSOCIATED WITH THE GIVEN MERCHANT FROM THE DATABASE ASSOCIATING MERCHANTS WITH ONE OR MORE FINANCIAL CATEGORIES OPERATION 509.

As seen in FIG. 6, in this specific example, remaining balance data display 611 of display 600 also includes the given user defined one or more budgetary and/or financial goals for the financial categories of school supplies, entertainment, clothing and home maintenance including: $100.00 for school supplies for the month of January; $200.00 for entertainment for the month of January; $100.00 for clothing for the month of January; and $100.00 for home maintenance for the month of January.

As seen in FIG. 6, in this specific example, remaining balance data display 611 of display 600 also includes a listing of the amounts spent so far in January in each of the financial categories of school supplies, entertainment, clothing and home maintenance including: $60.72 for school supplies; $100.87 for entertainment; $52.00 for clothing; and $0.00 for home maintenance.

As seen in FIG. 6, in this specific example, remaining balance data display 611 of display 600 also includes a listing of the remaining balance data for the potential financial categories of school supplies, entertainment, clothing, and home maintenance, associated with the given merchant "ONLINE SHOPPING NETWORK" for the given period of January that includes data indicating $39.28 remaining in the financial category of school supplies, $99.13 in the financial category of entertainment, $48.00 in the financial category of clothing, and $100.00 in the financial category of home maintenance and this data is displayed to the given user in the "ONLINE SHOPPING NETWORK" user interface that the given user accessed.

Continuing with this specific illustrative example, FIG. 7 illustrates that as the given user navigates within the given website associated with the given merchant "ONLINE SHOPPING NETWORK" to, as an example, the user interface 700 associated with the clothing types listing in sub-categories list 701, the potential financial categories associated with the given merchant of DETERMINE ONE OR MORE FINANCIAL CATEGORIES ASSOCIATED WITH THE GIVEN MERCHANT FROM THE DATABASE ASSOCIATING MERCHANTS WITH ONE OR MORE FINANCIAL CATEGORIES OPERATION 509 are refined, updated, and/or narrowed to reflect only the financial category of clothing associated with the user interface 700 currently being viewed and the remaining balance data display is refined to include only the potential financial category of clothing.

In the discussion above, certain aspects of one embodiment include process steps and/or operations and/or instructions described herein for illustrative purposes in a particular order and/or grouping. However, the particular order and/or grouping shown and discussed herein are illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein do not limit the scope of the invention as claimed below.

Using process for providing real-time financial goal monitoring and analysis 500, a connection is established between a webpage/website and/or web-based content currently being viewed by a given user, the merchant associated with the webpage/website and/or web-based content currently being viewed by a given user, potential financial categories associated with that merchant, user budgets associated those financial categories, and actual user spending in those financial categories for a defined period of time. Then, using one embodiment of process for providing real-time financial goal monitoring and analysis 500, these connections are leveraged to provide the user with a real-time display within the webpage/website and/or web-based content currently being viewed by a given user indicating to the given user what funds remain in each financial category associated with the webpage/website and/or web-based content currently being viewed by a given user. Consequently, using process for providing real-time financial goal monitoring and analysis 500, a given user can observe their relevant categorized budget and available balance at the time of purchase to make better spending decisions based on the real-time information and analysis displayed. Therefore, using process for providing real-time financial goal monitoring and analysis 500, the given user has a better opportunity to stay within budget, achieve financial goals, avoid overdrafts, and generally monitor their financial position before making a purchase.

The present invention has been described in particular detail with respect to specific possible embodiments. Those of skill in the art will appreciate that the invention may be practiced in other embodiments. For example, the nomenclature used for components, capitalization of component designations and terms, the attributes, data structures, or any other programming or structural aspect is not significant, mandatory, or limiting, and the mechanisms that implement the invention or its features can have various different names, formats, and/or protocols. Further, the system and/or functionality of the invention may be implemented via various combinations of software and hardware, as described, or entirely in hardware elements. Also, particular divisions of functionality between the various components described herein are merely exemplary, and not mandatory or significant. Consequently, functions performed by a single component may, in other embodiments, be performed by multiple components, and functions performed by multiple components may, in other embodiments, be performed by a single component.

Some portions of the above description present the features of the present invention in terms of algorithms and symbolic representations of operations, or algorithm-like representations, of operations on information/data. These algorithmic and/or algorithm-like descriptions and representations are the means used by those of skill in the art to most effectively and efficiently convey the substance of their work to others of skill in the art. These operations, while described functionally or logically, are understood to be implemented by computer programs and/or computing systems. Furthermore, it has also proven convenient at times to refer to these arrangements of operations as steps or modules or by functional names, without loss of generality.

Unless specifically stated otherwise, as would be apparent from the above discussion, it is appreciated that throughout the above description, discussions utilizing terms such as "creating", "determining", "generating", "obtaining", "identifying", "analyzing", "presenting", "storing", "saving", "displaying", "categorizing", "providing", "processing", "accessing", "monitoring" etc., refer to the action and processes of a computing system or similar electronic device that manipulates and operates on data represented as physical (electronic) quantities within the computing system memories, resisters, caches or other information storage, transmission or display devices.

Certain aspects of the present invention include process steps or operations and instructions described herein in an algorithmic and/or algorithmic-like form. It should be noted that the process steps and/or operations and instructions of the present invention can be embodied in software, firmware, and/or hardware, and when embodied in software, can be downloaded to reside on and be operated from different platforms used by real time network operating systems.

The present invention also relates to an apparatus or system for performing the operations described herein. This apparatus or system may be specifically constructed for the required purposes, or the apparatus or system can comprise a general purpose system selectively activated or configured/reconfigured by a computer program stored on a computer program product as defined herein that can be accessed by a computing system or other device.

Those of skill in the art will readily recognize that the algorithms and operations presented herein are not inherently related to any particular computing system, computer architecture, computer or industry standard, or any other specific apparatus. Various general purpose systems may also be used with programs in accordance with the teaching herein, or it may prove more convenient/efficient to construct more specialized apparatuses to perform the required operations described herein. The required structure for a variety of these systems will be apparent to those of skill in the art, along with equivalent variations. In addition, the present invention is not described with reference to any particular programming language and it is appreciated that a variety of programming languages may be used to implement the teachings of the present invention as described herein, and any references to a specific language or languages are provided for illustrative purposes only and for enablement of the contemplated best mode of the invention at the time of filing.

The present invention is well suited to a wide variety of computer network systems operating over numerous topologies. Within this field, the configuration and management of large networks comprise storage devices and computers that are communicatively coupled to similar and/or dissimilar computers and storage devices over a private network, a LAN, a WAN, a private network, or a public network, such as the Internet.

It should also be noted that the language used in the specification has been principally selected for readability, clarity and instructional purposes, and may not have been selected to delineate or circumscribe the inventive subject matter. Accordingly, the disclosure of the present invention is intended to be illustrative, but not limiting, of the scope of the invention, which is set forth in the claims below.

In addition, the operations shown in the FIG.s for method and system for providing real-time financial goal monitoring and analysis, discussed herein, are identified using a particular nomenclature for ease of description and understanding, but other nomenclature is often used in the art to identify equivalent operations.

Therefore, numerous variations, whether explicitly provided for by the specification or implied by the specification or not, may be implemented by one of skill in the art in view of this disclosure.

What is claimed is:

1. A computing system implemented process for providing real-time financial goal monitoring and analysis comprising the following of which are each executed via any set of one or more processors:

defining one or more financial or budgetary goals of a party, the one or more financial goals being associated with one or more financial categories for a defined period of time;

providing a merchant/category database, the merchant/category database associating one or more financial categories with one or more merchants;

accessing a given interface display of a given website of a given merchant;

responsive to accessing the interface display of a given website associated with the given merchant, determining which merchant is being displayed in the interface display based on Uniform Resource Locator data associated with the given website of the given merchant;

responsive to determining which merchant is being displayed, searching the merchant/category database to determine one or more financial categories associated with the given merchant;

responsive to determining one or more financial categories associated with the given merchant, accessing the data indicating the one or more financial or budgetary goals of the party associated with one or more financial categories for the defined period of time to obtain data indicating the one or more financial or budgetary goals;

obtaining current financial data associated with the party to determine the party's accumulated spending for the defined period of time in the one or more financial categories associated with the given merchant;

analyzing the data indicating the party's one or more financial or budgetary goals for the defined period of time and the current financial data associated with the party to generate data indicating a remaining balance associated with one or more of the one or more financial categories; and displaying the data indicating a remaining balance associated with one or more of the one or more financial categories associated with the given merchant for the defined period of time in a remaining balance data display.

2. The computing system implemented process for providing real-time financial goal monitoring and analysis of claim 1, wherein
   the merchant/category database includes data associating one or more financial categories with one or more merchants obtained from historical categorizations, by one or more parties, of transactions involving the one or more merchants.

3. The computing system implemented process for providing real-time financial goal monitoring and analysis of claim 1, wherein
the merchant/category database includes data associating one or more financial categories with one or more merchants obtained from categorizations by the party of historical transactions involving the one or more merchants.

4. The computing system implemented process for providing real-time financial goal monitoring and analysis of claim 1, wherein
the Uniform Resource Locator data associated with the given website associated with the given merchant is obtained using a browser plug-in to a network browser.

5. The computing system implemented process for providing real-time financial goal monitoring and analysis of claim 1, wherein
at least part of the current financial data associated with the party used to determine the party's spending so far for the defined period of time in the one or more financial categories associated with the given merchant is obtained from one or more sources of current financial data associated with the party selected from at least one of the group of sources of current financial data associated with the party consisting of:
a bank;
a debit card account;
a credit union;
an investment account; or
a credit card account.

6. The computing system implemented process for providing real-time financial goal monitoring and analysis of claim 1, wherein
the remaining balance data display is at least one remaining balance data display selected from at least one of the group of remaining balance data displays consisting of:
a pop-up display;
a data table;
a graphical symbol;
a graphical display;
a ledger;
a thermometer;
a display integrated into a browser framework; and
a sliding scale.

7. A system for providing real-time financial goal monitoring and analysis comprising:
one or more processors; and
one or more memories coupled to the one or more processors, the one or more memories having stored therein instructions which when executed by the one or more processors perform a process comprising:
defining one or more financial or budgetary goals of a party, the one or more financial goals being associated with one or more financial categories for a defined period of time;
providing a merchant/category database, the merchant/category database associating one or more financial categories with one or more merchants;
accessing a given interface display of a given website of a given merchant;
responsive to accessing the interface display of a given website associated with the given merchant, determining which merchant is being displayed in the interface display based on Uniform Resource Locator data associated with the given website of the given merchant;
responsive to determining which merchant is being displayed, searching the merchant/category database to determine one or more financial categories associated with the given merchant;
responsive to determining one or more financial categories associated with the given merchant, accessing the data indicating the one or more financial or budgetary goals of the party associated with one or more financial categories for the defined period of time to obtain data indicating the one or more financial or budgetary goals;
obtaining current financial data associated with the party to determine the party's accumulated spending for the defined period of time in the one or more financial categories associated with the given merchant;
analyzing the data indicating the party's one or more financial or budgetary goals for the defined period of time and the current financial data associated with the party to generate data indicating a remaining balance associated with one or more of the one or more financial categories; and
displaying the data indicating a remaining balance associated with one or more of the one or more financial categories associated with the given merchant for the defined period of time in a remaining balance data display.

8. The system for providing real-time financial goal monitoring and analysis of claim 7, wherein
the merchant/category database includes data associating one or more financial categories with one or more merchants obtained from categorizations, by one or more parties, of historical transactions involving the one or more merchants.

9. The system for providing real-time financial goal monitoring and analysis of claim 7, wherein
the merchant/category database includes data associating one or more financial categories with one or more merchants obtained from categorizations, by the party, of historical transactions involving the one or more merchants.

10. The system for providing real-time financial goal monitoring and analysis of claim 7, wherein
the Uniform Resource Locator data associated with the given website associated with the given merchant is obtained using a browser plug-in to a network browser.

11. The system for providing real-time financial goal monitoring and analysis of claim 7, wherein
the remaining balance data display is at least one remaining balance data display selected from at least one of the group of remaining balance data displays consisting of:
a pop-up display;
a data table;
a graphical symbol;
a graphical display;
a ledger;
a thermometer;
a display integrated into a browser framework; and
a sliding scale.

12. A computer program product for providing real-time financial goal monitoring and analysis comprising:
a nontransitory computer readable medium having stored therein instructions which when executed via any set of one or more processors, perform a process comprising:

defining one or more financial or budgetary goals of a party, the one or more financial goals being associated with one or more financial categories for a defined period of time;

providing a merchant/category database, the merchant/category database associating one or more financial categories with one or more merchants;

accessing a given interface display of a given website of a given merchant;

responsive to accessing the interface display of a given website associated with the given merchant, determining which merchant is being displayed in the interface display based on Uniform Resource Locator data associated with the given website of the given merchant;

responsive to determining which merchant is being displayed, searching the merchant/category database to determine one or more financial categories associated with the given merchant;

responsive to determining one or more financial categories associated with the given merchant, accessing the data indicating the one or more financial or budgetary goals of the party associated with one or more financial categories for the defined period of time to obtain data indicating the one or more financial or budgetary goals;

obtaining current financial data associated with the party to determine the party's accumulated spending for the defined period of time in the one or more financial categories associated with the given merchant;

analyzing the data indicating the party's one or more financial or budgetary goals for the defined period of time and the current financial data associated with the party to generate data indicating a remaining balance associated with one or more of the one or more financial categories; and displaying the data indicating a remaining balance associated with one or more of the one or more financial categories associated with the given merchant for the defined period of time in a remaining balance data display.

13. The computer program product for providing real-time financial goal monitoring and analysis of claim 12, wherein the merchant/category database includes data associating one or more financial categories with one or more merchants obtained from categorizations, by one or more parties, of historical transactions involving the one or more merchants.

14. The computer program product for providing real-time financial goal monitoring and analysis of claim 12, wherein the merchant/category database includes data associating one or more financial categories with one or more merchants obtained from categorizations, by the party, of historical transactions involving the one or more merchants.

15. The computer program product for providing real-time financial goal monitoring and analysis of claim 12, wherein the Uniform Resource Locator data associated with the given website associated with the given merchant is obtained using a browser plug-in to a network browser.

16. The computer program product for providing real-time financial goal monitoring and analysis of claim 12, wherein the remaining balance data display is at least one remaining balance data display selected from at least one of the group of remaining balance data displays consisting of:
a pop-up display;
a data table;
a graphical symbol;
a graphical display;
a ledger;
a thermometer;
a display integrated into a browser framework; and
a sliding scale.

* * * * *